US012677037B1

(12) United States Patent
     Das

(10) Patent No.: US 12,677,037 B1
(45) Date of Patent: Jul. 7, 2026

(54) METHODS, SYSTEMS, AND DEVICES FOR PROVIDING VIDEO CONTENT TO A COMMUNICATION DEVICE

(71) Applicant: Nova Blue Patent Holdings, LLC, Chicago, IL (US)

(72) Inventor: Roshan Das, Chicago, IL (US)

(73) Assignee: Nova Blue Patent Holdings, LLC, Chicago, IL (US)

( * ) Notice: Subject to any disclaimer, the term of this patent is extended or adjusted under 35 U.S.C. 154(b) by 0 days.

(21) Appl. No.: 19/392,099

(22) Filed: Nov. 17, 2025

Related U.S. Application Data

(63) Continuation-in-part of application No. 19/295,131, filed on Aug. 8, 2025, now Pat. No. 12,477,183.

(51) Int. Cl.
     *H04N 21/466*      (2011.01)
     *H04N 21/239*      (2011.01)
     *H04N 21/439*      (2011.01)
     *H04N 21/442*      (2011.01)
(52) U.S. Cl.
     CPC ..... *H04N 21/4667* (2013.01); *H04N 21/2393* (2013.01); *H04N 21/4392* (2013.01); *H04N 21/44213* (2013.01)

(58) Field of Classification Search
     CPC ........... H04N 21/4667; H04N 21/2393; H04N 21/4392; H04N 21/44213
     See application file for complete search history.

(56) References Cited

U.S. PATENT DOCUMENTS

| | | | |
|---|---|---|---|
| 9,602,619 B1 * | 3/2017 | Eldawy .............. | G06F 16/4387 |
| 2012/0123982 A1 * | 5/2012 | Croft .................... | G11B 27/105 |
| | | | 706/14 |
| 2012/0227063 A1 * | 9/2012 | Tsurumi ................. | H04N 21/84 |
| | | | 725/10 |
| 2014/0214806 A1 * | 7/2014 | Sakata .............. | G06F 16/90335 |
| | | | 707/722 |

* cited by examiner

*Primary Examiner* — Gigi L Dubasky

(57)                ABSTRACT

Aspects of the subject disclosure may include, for example, determining a user of a communication device, obtaining first viewing information of the user, the first viewing information comprises a first probability indicating a probability that a user skips viewing a video, and the first viewing information comprises a second probability that a user views an entire video. Further embodiments can include determining a first group of videos to request from a server based on the first probability and the second probability, requesting the first group of videos from a server, and receiving the first group of videos from the server. Additional embodiments can include storing the first group of videos in a video buffer on the communication device, and presenting a first video from the first group of videos to the user on a display of the communication device. Other embodiments are disclosed.

20 Claims, 13 Drawing Sheets

100

200

210

212

220

Software Application
230a
Group of Users
Probabilities $p_1$
$p_2$

AI Software
Application
230a

230c

100c

230

320

330

500

METHODS, SYSTEMS, AND DEVICES FOR PROVIDING VIDEO CONTENT TO A COMMUNICATION DEVICE

CROSS REFERENCE TO RELATED APPLICATIONS

This application is a continuation of U.S. patent application Ser. No. 19/295,131 filed on Aug. 8, 2025. All sections of the aforementioned application are incorporated herein by reference in their entirety.

FIELD OF THE DISCLOSURE

The subject disclosure relates to methods, devices, and devices for providing video content to a communication device.

BACKGROUND

Historically, it has been challenging for social media companies to determine a number of videos to download into a video buffer of a communication device (e.g., mobile phone) from a social media server for a user based on their viewing habits. Downloading not enough videos can lead to emptying the video buffer too quickly if the user skips viewing too many videos quickly and thereby needs to wait for more videos to download from the social media server, thereby diminishing the user video viewing experience waiting for more videos to download to view. Downloading too many videos may take up too much memory on the communication device for the video buffer thereby impacting the functioning of other aspects of the communication device that may need such memory and diminishing the user experience in enjoying other aspects of utilizing the communication device.

BRIEF DESCRIPTION OF THE DRAWINGS

Reference will now be made to the accompanying drawings, which are not necessarily drawn to scale, and wherein.

DETAILED DESCRIPTION

Figure 1:
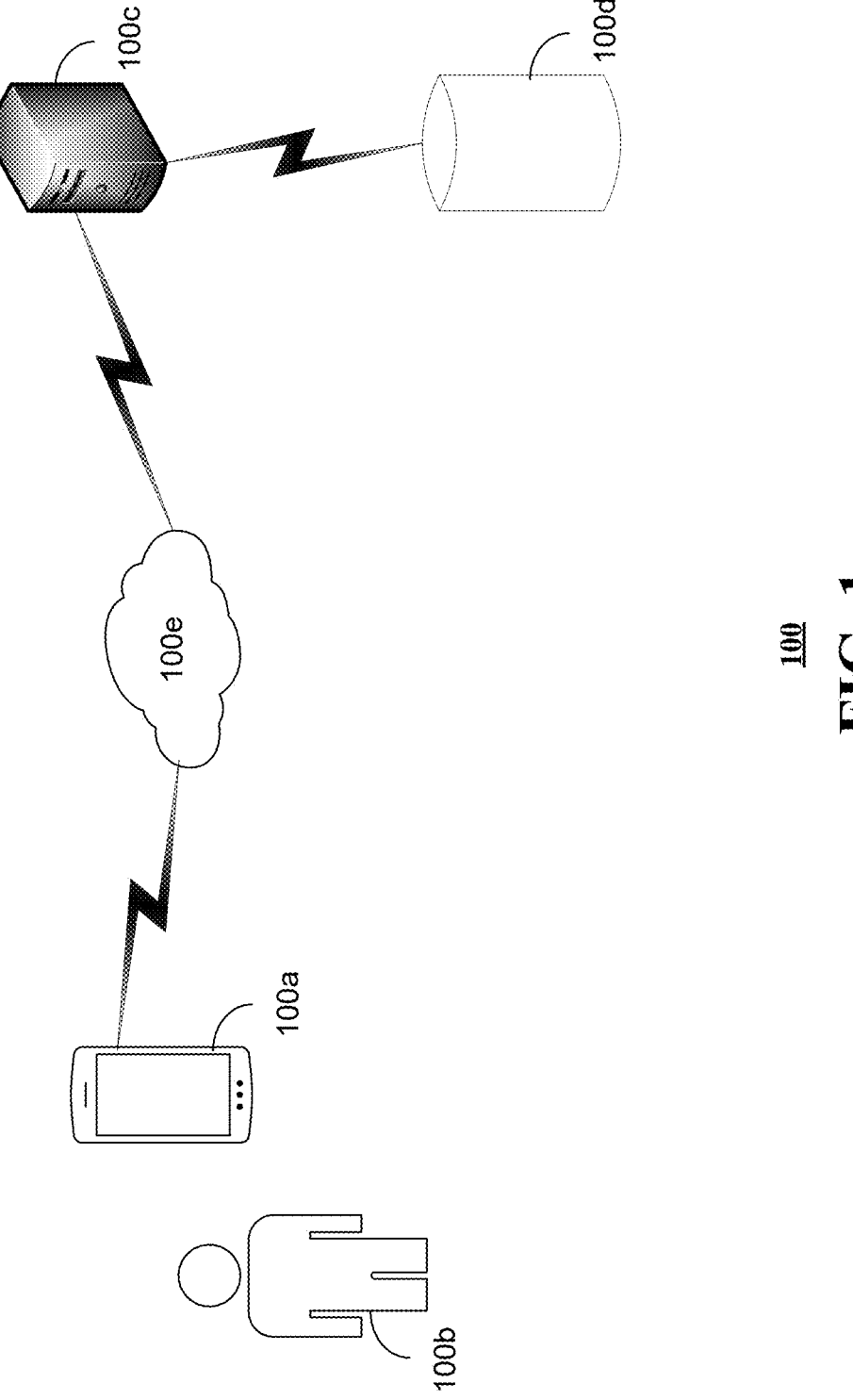
FIG. 1 and FIG. 2A, FIG. 2B, FIG. 2C, FIG. 2D, and FIG. 2E are block diagrams illustrating exemplary, non-limiting embodiments of providing video content to a communication device in accordance with various aspects described herein.

The subject disclosure describes, among other things, illustrative embodiments for determining a user of the communication device, obtaining first viewing information associated with the user, the first viewing information comprises a first probability indicating a probability that a user skips viewing a video, and the first viewing information comprises a second probability that a user views an entire video. Further embodiments can include determining a first group of videos to request from a server based on the first probability and the second probability, a first number of videos of the first group of videos is calculated according to a first equation (e.g. formula) comprising $[(\log_{10}(1-[(p_1-p_2)/P(z)])/\log_{10}(p_2 \ p_1)]-1$, wherein $p_1$ is equal to the first probability, wherein $p_2$ is equal to the second probability, wherein $P(z)$ is a probability of no videos are stored in a video buffer of the communication device and the user skips viewing a current video $(p_1)$. Additional embodiments can include requesting, over a communication network, the first group of videos from a server, receiving, over the communication network, the first group of videos from the server, storing the first group of videos in the video buffer of the communication device, and presenting a first video from the first group of videos to the user on a display of the communication device. Other embodiments are described in the subject disclosure.

One or more aspects of the subject disclosure include a communication device, comprising a processing system including a processor, and a memory that stores executable instructions that, when executed by the processing system, facilitate performance of operations. The operations can comprise determining a user of the communication device, obtaining first viewing information associated with the user, the first viewing information comprises a first probability indicating a probability that a user skips viewing a video, and the first viewing information comprises a second probability that a user views an entire video. Further operations can comprise determining a first group of videos to request from a server based on the first probability and the second probability, a first number of videos of the first group of videos is calculated according to a first equation (e.g., formula) comprising $[(\log_{10}(1-[(p_1-p_2)/P(z)])/\log_{10}(p_2 \ p_1)]-1$, wherein $p_1$ is equal to the first probability, wherein $p_2$ is equal to the second probability, wherein $P(z)$ is a probability of no videos are stored in a video buffer of the communication device and the user skips viewing a current video $(p_1)$. Additional operations can comprise requesting, over a communication network, the first group of videos from a server, receiving, over the communication network, the first group of videos from the server, storing the first group of videos in the video buffer of the communication device, and presenting a first video from the first group of videos to the user on a display of the communication device.

One or more aspects of the subject disclosure include a non-transitory machine-readable medium, comprising executable instructions that, when executed by a processing system including a processor, facilitate performance of operations. The operations can comprise determining a user associated with the processing system, obtaining first viewing information associated with the user, the first viewing information comprises a first probability indicating a probability that a user skips viewing a video, and the first viewing information comprises a second probability that a user views an entire video. Further operations can comprise determining available computer resources associated with the processing system, selecting a portion of a group of artificial intelligence (AI) models based on the available computer resources, and the portion of the group of AI models comprises one or more of the group of AI models. Additional operations can comprise determining a first group of videos to request from a server based on the first probability and the second probability utilizing an AI software application, the AI software application implements the portion of the group of AI models, a first number of videos of the first group of videos is calculated according to an equation (e.g., formula) comprising $[(\log_{10}(1-[(p_1-p_2)/P(z)])/\log_{10}(p_2/p_1)]-1$, wherein $p_1$ is equal to the first probability, wherein $p_2$ is equal to the second probability, wherein $P(z)$ is a probability of no videos are stored in a video buffer of the processing system and the user skips viewing a current video ($p_1$). Also, the operations can comprise requesting, over a communication network, the first group of videos from a server, receiving, over the communication network, the first group of videos from the server, storing the first group of videos in the video buffer of the processing system, and presenting a first video from the first group of videos to the user on a display of the processing system.

One or more aspects of the subject disclosure include a communication device, comprising a processing system including a processor, and a memory that stores executable instructions that, when executed by the processing system, facilitate performance of operations. The operations can comprise determining a user of the communication device, obtaining first viewing information associated with the user, the first viewing information comprises a first probability indicating a probability that a user skips viewing a video, and the first viewing information comprises a second probability that a user views an entire video. Further operations can comprise determining available computer resources associated with the communication device, selecting a portion of a group of artificial intelligence (AI) models based on the available computer resources, and the portion of the group of AI models comprises one or more of the group of AI models. Additional operations can comprise determining a first group of videos to request from a server based on the first probability and the second probability utilizing an AI software application, the AI software application implements the portion of the group of AI models, a first number of videos of the first group of videos is calculated according to a first equation (e.g., formula) comprising $[(\log_{10}(1-[(p_1-p_2)/P(z)])/\log_{10}(p_2\ p_1)]-1$, wherein $p_1$ is equal to the first probability, wherein $p_2$ is equal to the second probability, wherein $P(z)$ is a probability of no videos are stored in a video buffer of the communication device and the user skips viewing a current video ($p_1$). Also, the operations can comprise obtaining, over a communication network, second viewing information associated with a group of users from a social media server, the second viewing information comprises a third probability indicating a probability that the group of users skips viewing a video, and the second viewing information comprises a fourth probability that the group of users views an entire video. Further operations can comprise determining a second group of videos to request from the server based on the third probability and the fourth probability utilizing the AI software application, a second number of videos of the second group of videos is calculated according to a second equation (e.g., formula) comprising $[(\log_{10}(1-[(p_3-p_4)/P(z)])/\log_{10}(p_4\ p_3)]-1$, wherein $p_3$ is equal to the third probability, wherein $p_4$ is equal to the fourth probability, wherein $P(z)$ is the probability of no videos are stored in the video buffer of the communication device and the user skips viewing the current video ($p_3$). Additional operations can comprise determining a device type associated with the communication device, determining a group of network conditions associated with the communication network, determining a location of the communication device, and determining a time of day associated with the communication device. Also, the operations can comprise determining a third group of videos to request from the server based on the first group of videos, the second group of videos, the device type associated with the communication device, the group of network conditions, the location of the communication device, the time of day associated with the communication device, and the available computer resources associated with the communication device utilizing the AI software application, requesting, over a communication network, the third group of videos from a social media server, receiving, over the communication network, the third group of videos from the social media server, storing the third group of videos in the video buffer of the communication device, and presenting a first video from the third group of videos to the user on a display of the communication device utilizing a social media software application associated with the social media server.

FIG. 1 and FIG. 2A, FIG. 2B, FIG. 2C, FIG. 2D, and FIG. 2E are block diagrams illustrating exemplary, non-limiting embodiments of providing video content in accordance with various aspects described herein. Referring to FIG. 1, in one or more embodiments, system 100 includes a communication device 100a associated with a user 100b communicative coupled to a social media server 100c over a communication network 100e. Further, the system 100 can include a database 100d (e.g., video repository), which can be a database or any other storage device. In some embodiments, database 100d can be communicatively coupled to social media server 100c over communication network 100e, or over another communication network. In other embodiments, database 100d can be integrated into social media server 100c.

In one or more embodiments, communication device 100a can include, but are not limited to, a mobile phone, smartphone, mobile device, tablet computer, laptop computer, desktop computer, wearable device, smart television, or any other communication device. Further, communication network 100e can comprise one or more wired communication networks, one or more wireless communications networks, or a combination thereof. In addition, social media server 100c can comprise one or more servers residing in one location, one or more servers spanning multiple locations, one or more virtual servers residing in one location, one or more virtual servers spanning multiple locations, one or more cloud servers, or a combination thereof. In some embodiments, social media server 100c can provide one or more videos to communication device 100a over communication network 100e. A social media application on the communication device 100a can receive and present the videos to user 100b.

In one or more embodiments, a communication device 100a can determine user 100b is utilizing communication device 100a. Further, the communication device 100a can obtain viewing information associated with user 100b. In addition, the communication device 100a can determine a group of videos to request from social media server 100c based on probabilities determined from the viewing information. One probability can indicate the likelihood that user 100b will skip viewing a video while another probability can indicate the likelihood that user 100b will view a substantial portion or significant amount of the video.

Figure 2A:
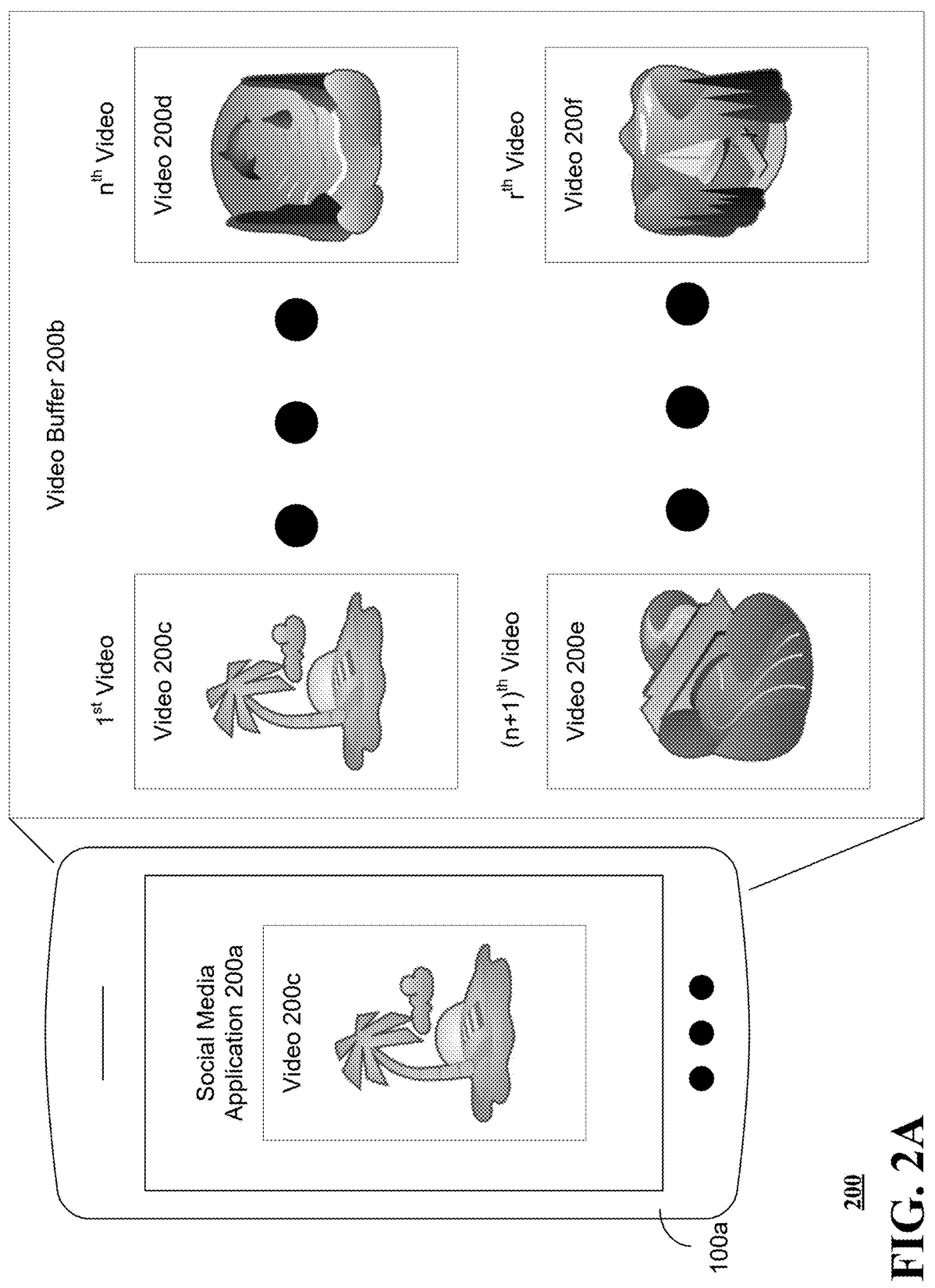

Referring to FIG. 2A, in one or more embodiments, system 200 can include communication device 100a. Further, communication device 100a can include a social media application 200a that presents video 200c (e.g., 1$^{st}$ video). In addition, communication device 100a can comprise a video buffer 200b. Also, video buffer 200b can store r videos downloaded or otherwise received from social media server 100c, which can include video 200d (n$^{th}$ video), and video 200e ((n+1)$^{th}$) video.

In one or more embodiments, user 100b can be presented video 200c but does not care to view video 200c at the current time, thereby user 100b provides user-generated input (e.g., swiping the touchscreen of communication device 100a) to skip viewing video 200c. Subsequently, the social media application 200a can present the next video in video buffer 200b to user 100b. For some videos, user 100b can view a substantial portion or significant amount of the video while for other videos user 100b can provide user-generated input to skip viewing them. If user 100b skips viewing consecutive videos the number of videos in the video buffer 200b (e.g., r videos), the video buffer 200b can be exhausted of, or otherwise run out of, videos before more videos can be downloaded from social media server 100c over communication network 100e. This can stall the social media application 200a, thereby diminishing the user experience by waiting for a prolonged period of time for more videos to be downloaded from social media server 100c to video buffer 200b. Alternatively, if the communication device 100a downloads too many videos, it can consume too much of its memory thereby unable to provide other communication device functions that may also diminish the user experience. Thus, there is a need for the communication device 100a to determine enough videos so that the user 100b cannot exhaust the number of videos in the video buffer 200b, but not too many videos as to overload the memory/video buffer 200b of communication device 100a such impacts other communication device functions.

In one or more embodiments, communication device 100a can store viewing information associated with user 100b. That is, the communication device 100a can record how often user 100b skips viewing a video and can record how often user 100b can view a substantial portion or significant amount of the video. Based on this viewing information, communication device 100a can determine the likelihood user 100b can skip viewing a video (e.g., skip probability) and can determine the likelihood user 100b can view a substantial portion or significant amount of the video (e.g., view probability). In some embodiments, the skip probability can be the likelihood user 100b views a video for a relatively short period of time (e.g., less than five seconds) and then skips the video. In other embodiments, the view probability can be the likelihood user 100b views a video for a relatively substantial/significant period of time (e.g., 60 seconds). Further, the communication device 100a can determine a number of videos within a group of videos based on the skip probability and the view probability, thereby maintaining a current user experience without diminishing it. For example, for a time period, the video buffer includes 10 videos. User 100b skips viewing three videos but views a substantial portion of each of the seven other videos. Thus, the skip probability can be calculated as $3/10$ or 0.3 or 30% and the view probability can be calculated as $7/10$ or 0.7 or 70%.

Figure 2B:
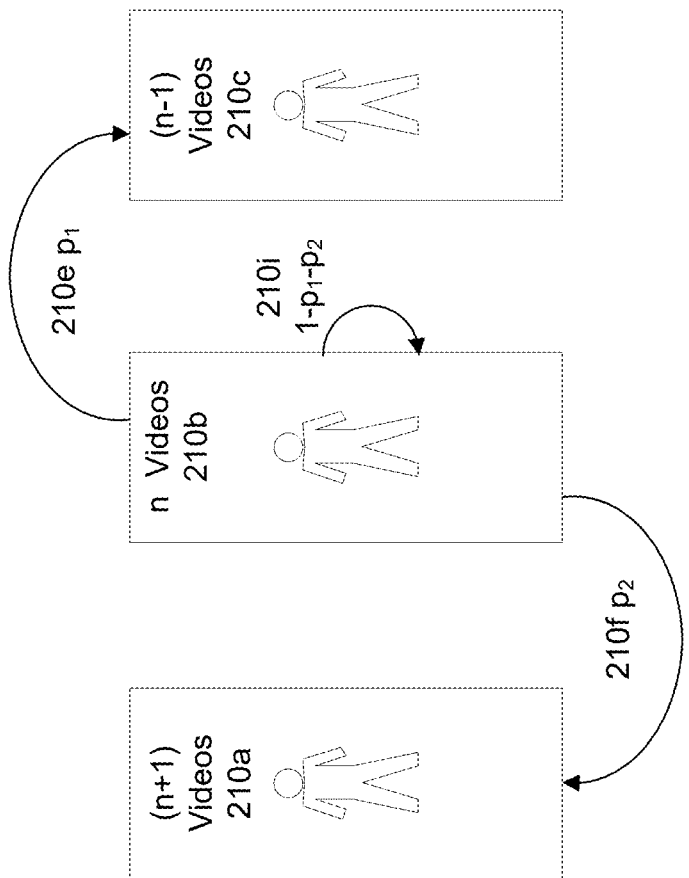

Referring to FIG. 2B, in one or more embodiments, system 210 shows a portion of different states of a video buffer within a Markov process in which each state of the video buffer indicates a group or number of videos stored (i.e. remaining) in video buffer 200b of communication device 100a associated with a social media application 200a. The video buffer 200b may be storing the group of videos that include r (total) number of videos (See FIG. 2A and FIG. 2C). Further, a state 210a indicates that video buffer 200b stores a (n+1) videos, a state 210b indicates that video buffer 200b stores n videos, and a state 210c indicates that video buffer 200b stores (n−1) videos 210c. Further, a user 100b can view a portion of the r videos associated with the social media application 200a stored in the video buffer 200b, which includes a $(n+1)^{th}$ video in state 210a, a $n^{th}$ video in state 210b, and a $(n-1)^{th}$ video in state 210c. In addition, user 100b can view a current video (e.g., $n^{th}$ video 210b) for different lengths of the time using the scrolling feature of the social media application 200a. While the user 100b views videos on the communication device 100a (e.g., mobile device), communication device 100a continually downloads additional videos from social media server 100c into the video buffer 200b of communication device 100a. Note, in some embodiments, the videos stored in the video buffer 200b can include a portion of the videos that can be the same videos but in other embodiments the videos stored in the video buffer 200b can include a portion of the videos in which the videos are different.

In one or more embodiments, one length of time a user can view a current video can be associated with user 100b skipping the current video after viewing the current video for a short period of time (e.g., less than second—not a significant amount of time) such that during this short period of time, the communication device 100a has not fully downloaded another video from the social media server 100c into the video buffer 200b such that the number videos stored in the video buffer 200b has decreased by one video (note, after the current video is skipped, it is deleted from the video buffer 200b), thereby moving from a higher state to a lower state (e.g., from state 210b to state 210c) within the Markov process representing the different states of video buffer 200b. During another length of time, user 100b can partially view a current video for a significant period of time (e.g., 10-30 seconds) such that communication device 100a has fully downloaded one other video from the social media server 100c during this significant period of time (e.g., 10-30 seconds) such that the number of videos stored in the video buffer 200b remains the same (i.e., one video is downloaded to the video buffer from the social media server 100c while current video is deleted from the video buffer after being viewed by user 100b), thereby the Markov process representing the different states of video buffer remains in a same state (e.g., video buffer remains in state 210b). A user 100b can view a current video can be for a long period of time (e.g., greater than 30 seconds—can be the entire video) such that communication device 100a has downloaded two videos from the social media server 100c during this long period of time (e.g., greater than 30 seconds) such that the number of videos stored in the video buffer 200b increases by one video (i.e., two videos are downloaded to the video buffer 200b from the social media server 100c while current video is deleted from the video buffer after being viewed by the user 100b), thereby the Markov process representing the different states of video buffer moves from a lower state to a higher state (e.g., moving from state 210b to state 210a).

In one or more embodiments, system 210 can represent the Markov process associated with the video buffer 200b of communication device 100a. A Markov process can refer to, but is not limited to, a stochastic process that models a sequence of possible events in which the probability of each event depends solely on the state attained in the previous event. In the context of the embodiments described herein, the Markov process can be utilized to represent the state transitions between different numbers of videos stored in the video buffer 200b, in which the number of videos stored (e.g., remaining) in the video buffer 200b represent the states of the Markov process. Further, each state transition can be associated with a probability (e.g., based on historical usage statistics of user 100b, historical usage statistics of a group of user, prediction based on AI/ML models, etc.).

In one or more embodiments, user 100b can be in state 210b such that the user 100b is viewing a current video with the n videos stored (e.g., remaining) in the video buffer 200*b* on communication device 100*a* utilizing the social media application 200*a*. User 100*b*, with probability p₁ 210*e*, can skip viewing the current video such that the user 100*b* views the current video for a short period of time (e.g., less than one second). Consequently, due to user 100*b* skipping viewing of the current video, communication device 100*a* does not have enough time to download another video from the social media server 100*c* into the video buffer 200*b* and the skipped current video has been deleted from the video buffer 200*b* such that there are only (n−1) videos stored in the video buffer 200*b*, thereby moving from state 210*b* to state 210*c*.

In one or more embodiments, user 100*b* can view a current video such that there are n videos stored (e.g., remaining) in the video buffer 200*b* on communication device 100*a* utilizing the social media application 200*a*. User 100*b*, with probability p₂ 210*f*, can view the current video for a long period of time (e.g., greater than 30 seconds). Consequently, due to user 100*b* viewing the current video for a long period of time, communication device 100*a* has enough time to download two videos from the social media server 100*c* into the video buffer 200*b* and the current video that was viewed has been deleted from the video buffer 200*b* such that there are currently (n+1) videos stored in the video buffer 200*b*, thereby the moving from state 210*b* to state 210*a*.

In one or more embodiments, user 100*b* can view a current video such that there are n videos stored (e.g., remaining) in the video buffer 200*b* on communication device 100*a* utilizing the social media application 200*a*. User 100*b*, with probability 1−p₂−p₂ 210*i*, can view the current video for a significant period of time (e.g., 10-30 seconds). Consequently, due to user 100*b* viewing the current video for a significant period of time, communication device 100*a* has enough time to download one video from the social media server 100*c* into the video buffer 200*b* and the current video that was viewed has been deleted from the video buffer 200*b* such that there are still n videos stored in the video buffer 200*b*, thereby the video buffer 200*b* remains in state 210*b*.

Figure 2C:
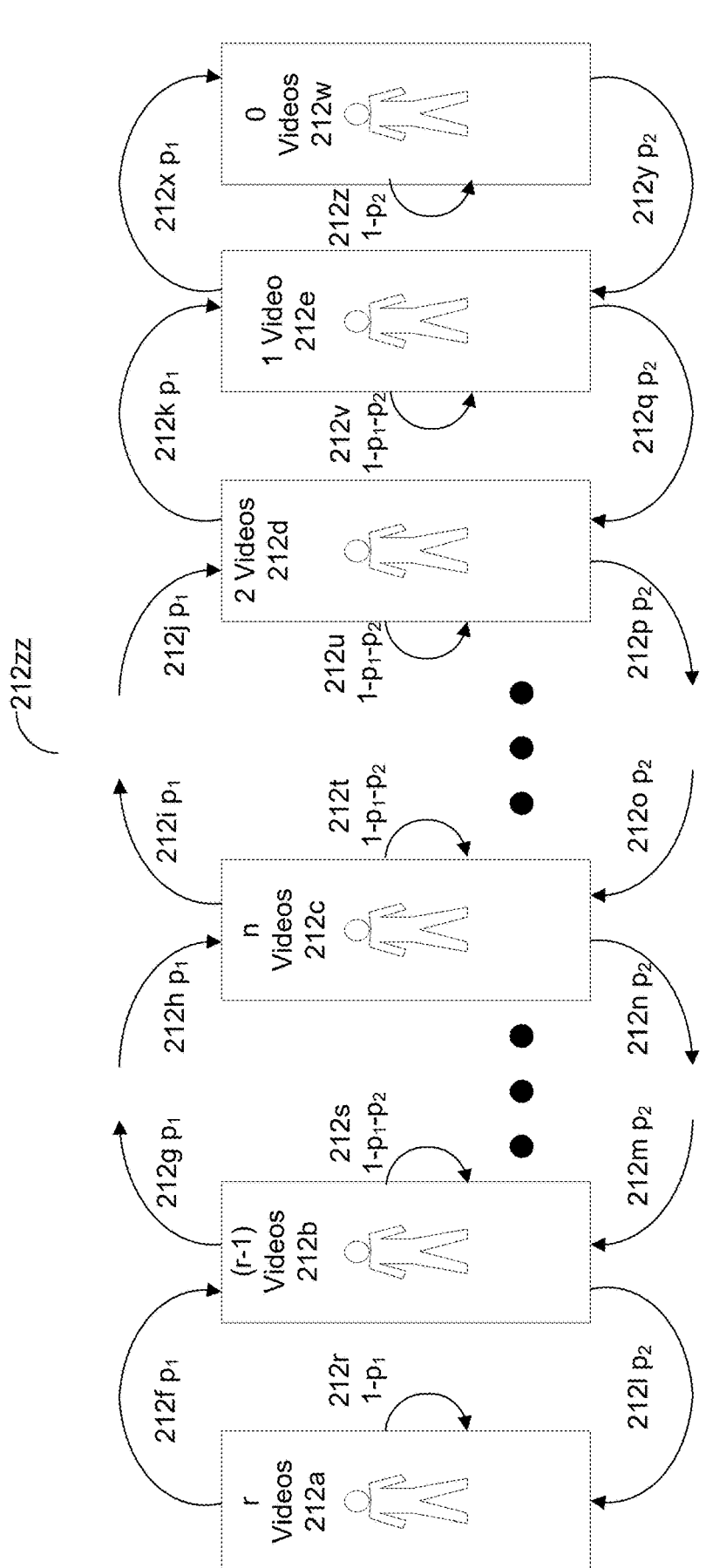

Referring to FIG. 2C, in one or more embodiments, system 212 represents states in a Markov process associated with the videos stored (e.g., remaining) in the video buffer 200*b* of the communication device 100*a*. Specifically, the Markov process is characterized by a finite set of states (e.g., r video states), where each state corresponds to a particular number of videos stored (e.g., remaining) in the video buffer 200*b* at a given time. The transition from one state to another occurs as the user 100*b* skips viewing a video (e.g., views for a short period of time (e.g., less than one second)), views for a significant period of time (e.g., 10-30 seconds), views for a long period of time (e.g., greater than 30 seconds)), with each transition associated with a probability. These probabilities, such as the probability (p₁) that a user skips a video (e.g., views a video for a short period of time) such no videos can be downloaded into the video buffer 200*b*, the probability (1−p₁−p₂) that a user views a video long enough for one video to download into video buffer 200*b*, and the probability (p₂) that a user views a video long enough for two videos to download into the video buffer 200*b*, govern the likelihood of moving from one video buffer state to another.

The Markov property ensures that the future state of the video buffer 200*b* depends only on its current state and not on the sequence of events that preceded it. This Markov property enables the construction of a transition matrix, where each entry represents the probability of transitioning from one video buffer state to another in a single step. The Markov process allows for the prediction of buffer exhaustion (e.g., there are no more videos left in the video buffer 200*b*), video loading dynamics, and the overall user experience in video content delivery systems.

Let $X_n$ equal the number of videos stored in the video buffer 200*b*. Additionally, let the possible values of $X_n$ be 0, 1, 2, . . . r. These possible $X_n$ values can represent r+1 states (e.g., states can range from 0 videos in the video buffer 200*b* to *r* videos in the video buffer 200*b*) of the Markov process associated with the number of videos stored in the video buffer 200*b*. Further, $p_1$ equals the probability that a user skips viewing current video in such a way that no additional video can be downloaded into video buffer 200*b*. In addition, $p_2$ equals the probability that the user views a current video long enough such that two videos can download into the video buffer 200*b* while the user views the current video. Also, $1−p_1−p_2$ equals the probability equals the probability that the user views a current video long enough such that one video can download into the video buffer 200*b* while the user views the current video. To compute the transition probabilities of the resulting Markov process, let i=1, 2, . . . r−1 and note in FIG. 2C the way in which the Markov process can transition from i videos stored in the video buffer to i−1 videos stored in the video buffer after skipping view a current video. As shown below:

$$P_{i,1\text{-}1}=p_1 \text{ for } i=1, 2, \ldots r\text{-}1. \tag{1}$$

Similarly, note how the Markov process can go from i videos stored in the video buffer 200*b*, after viewing the current video for a long period of time, to i+1 videos stored in the video buffer (e.g., two videos downloaded during viewing of the current video for the long period of time). Further, the Markov process can go from i videos stored in the video buffer 200*b*, after viewing the current video for a significant period of time, to i videos stored in the video buffer 200*b* (e.g., one video downloaded during viewing of the current video for the long period of time). As shown below:

$$P_{i,1+1}=p_2 \text{ and } P_{i,1}=1\text{-}p_1\text{-}p_2 \text{ for } i=1, 2, \ldots r\text{-}1. \tag{2}$$

The two boundary cases are i=0 and i=r. For i=0, it can be shown $$P_{0,1}=p_2 \text{ and thus, } P_{0,0}=1\text{-}p_2 \tag{3}$$

And for i=r, the result can be $$P_{r,r\text{-}1}=p_1 \text{ and thus, } P_{r,r}=1\text{-}p_1 \tag{4}$$

Thus, using this r+1 by r+1 transition matrix, r+1 by r+1 transition matrix can be constructed. As shown below:

$$P = \begin{bmatrix} 1-p_2 & p_2 & 0 & 0 & \ldots & 0 & 0 & 0 & 0 \\ p_2 & 1-p_1-p_2 & p_2 & 0 & \ldots & 0 & 0 & 0 & 0 \\ 0 & p_2 & 1-p_1-p_2 & p_2 & \ldots & 0 & 0 & 0 & 0 \\ \vdots & \vdots & \vdots & \vdots & \vdots & \vdots & \vdots & \vdots & \vdots \\ 0 & 0 & 0 & 0 & \ldots & p_1 & 1-p_1-p_2 & p_2 & 0 \\ 0 & 0 & 0 & 0 & \ldots & 0 & p_1 & 1-p_1-p_2 & p_2 \\ 0 & 0 & 0 & 0 & \ldots & 0 & 0 & p_1 & 1-p_2 \end{bmatrix} \tag{5}$$

To solve for the invariant vector $\pi$, the equation $\pi = \pi P$ can be used. Solving for the first component gives:

$$\pi_0 = \pi_0(1-p_2) + \pi_1 p_1 \text{ which yields } \pi_1 = (p_2/p_1)\pi_0 \tag{6}$$

For the second component $$\pi_1 = \pi_0 p_2 + \pi_1(1-p_1-p_2) + \pi_2 p_1, \text{ substituting } \pi_0 = (p_1/p_2)\pi_1 \text{ gives} \tag{7}$$

$$\pi_1 = \pi_1 p_1 + \pi_1(1-p_1-p_2) + \pi_2 p_1 \text{ which yields } \pi_2 = (p_2/p_1)\pi_1 \tag{8}$$

Note that the rest of the columns up to $r-1$ have the same entries, shifted by one position. Thus, it can be shown $$\pi_i = (p_2/p_1)\pi_{i-1} \text{ for } i=1, 2, \ldots r-1 \tag{9}$$

For the last column, it can be shown:

$$\pi_r = \pi_{r-1} p_2 + \pi_r(1-p_1) \text{ which yields } \pi_r = (p_2/p_1)\pi_{r-1} \text{ as well} \tag{10}$$

Thus, this relationship holds, meaning $$\pi_i = (p_2/p_1)\pi_{i-1} \text{ for } i=1, 2, \ldots r \tag{11}$$

From this recursive relationship, it can be derived that $$\pi_i(p_2/p_1)^i \pi_0 \text{ for } i=1, 2, \ldots r \tag{12}$$

Use the fact that all the entries of $\pi$ add to 1, $$1=\pi_0+\pi_1+\ldots \pi_r=\pi_0+(p_2/p_1)\pi_0+(p_2/p_1)_2\pi_0+\ldots(p_2/p_1)^r\pi_0 \tag{13}$$

This expression is a finite geometric series. Therefore, using the formula for a finite geometric series, it could be found that:

$$1=\pi_0[(1-(p_2/p_1)^{r+1})/(1-(p_2/p_1))] \text{ solving for } \pi_0 \text{ gives} \tag{14}$$

$$\pi_0=(1-(p_2/p_1))/(1-(p_2/p_1)^{r+1}) \tag{15}$$

Stalling (e.g., no videos are left in the video buffer $200b$ AND user $100b$ skips viewing a current video) occurs when videos are skipped too quickly by user $100b$ in such a way that no new videos can be downloaded from the social media application in the interim, thereby there are no videos (e.g., zero videos) in the video buffer. Thus $$P(\text{zero videos in buffer AND user wants to skip viewing the current video } (p_1))=p_1\pi_0(p_1-p_2)/(1-(p_2/p_1)^{r+1}) \tag{16}$$

Let P(zero videos in buffer AND user wants to skip viewing the current video $(p_1)$)=P(z). Solving for r using algebraic manipulation results in the following:

$$r=[(\log_{10}(1-[(p_1-p_2)/P(z)])/\log_{10}(p_2 p_1)]-1 \tag{17}$$

Note, although the logarithmic (e.g., log) function of $\log_{10}$ (e.g., logarithmic function with base 10) is used in equation (17) (e.g., formula), a logarithmic function of any base can be used as long as the same base is used in both logarithmic functions in equation (17).

In one or more embodiments, system 212 can show that initially r number of videos (e.g., group of videos that include r number of videos) are downloaded into video buffer $200b$ of communication device $100a$ from social media server $100c$ when a user $100b$ initiates a social media application $200a$ on the communication device $100a$. System 212 shows the Markov process $212zz$ that represents the number of videos in video buffer $200b$. Each state represents a number of videos in the video buffer $200b$. That is, the states in the Markov process includes the state $212a$ representing r videos stored in the video buffer $200b$, the state $212b$ representing (r-1) videos stored in the video buffer $200b$, the state $212c$ representing n videos stored in the video buffer $200b$, the state $212d$ representing 2 videos $212d$ stored in the video buffer $200b$, the state $212e$ representing 1 video $212e$ stored in the video buffer $200b$, and the state $212w$ representing 0 videos stored in the video $200b$ while attempting to view a current video.

In one or more embodiments, the Markov process $212zz$ includes the transitional probabilities from transitioning from one state to another state based on the probability a user $100b$ viewing a video stored in the video buffer $200b$ for a different periods of time. A user $100b$ can skip viewing a current video (e.g., viewing the video for a short period of time—less than a second) such that no videos can be downloaded. Further, user $100b$ can view a current video for significant period of time (e.g., 10-30 seconds) such that one video is downloaded from the social media server $100c$ into video buffer $200b$. In addition, user $100b$ can view a current video for a long period of time (e.g., greater than 30 seconds) such that two videos can be downloaded into video buffer $200b$ from the social media server $100c$.

In one or more embodiments, if the video buffer $200b$ is in state $212a$ such that user $100b$ is viewing a current video while there are r videos stored (e.g., remaining) in video buffer $200b$ but skips viewing the current video such that the current video is deleted from the video buffer $200b$ and no video can be downloaded into video buffer $200b$ from the social media server $100c$ while the current video is being skipped, thus the state of the video buffer $200b$ moves from state $212a$ to state $212b$ such that there are (r-1) videos remain being stored in video buffer $200b$. Thus, there is a transition probability $p_1$ $212f$ of transitioning from state $212a$ indicating the video buffer $200b$ having r videos to having (r-1) videos stored in video buffer $200b$ due to user $100b$ skipping viewing the current video.

In one or more embodiments, if the video buffer $200b$ is in state $212b$ such that user $100b$ is viewing a current video while there are (r-1) videos stored (e.g., remaining) in video buffer $200b$ but skips viewing the current video such that the current video is deleted from the video buffer $200b$ and no video can be downloaded into video buffer $200b$ from the social media server $100c$ while the current video is being skipped, thus the state of the video buffer $200b$ moves from state $212b$ to a state such that there are (r-2) videos remain being stored in video buffer $200b$. Thus, there is a transition probability $p_1$ $212g$ of transitioning from having (r-1) videos to having (r-2) videos (not shown) stored in video buffer $200b$ due to user $100b$ skipping viewing the current video.

In one or more embodiments, if the video buffer $200b$ is in state such that user $100b$ is viewing a current video while there are (n+1) videos stored (e.g., remaining) in video buffer $200b$ but skips viewing the current video such that the current video is deleted from the video buffer $200b$ and no video can be downloaded into video buffer $200b$ from the social media server $100c$ while the current video is being skipped, thus the state of the video buffer $200b$ moves from a state that has (n+1) videos to a state $212c$ there are n videos remain being stored in video buffer $200b$. Thus, there is a transition probability $p_1$ $212h$ of transitioning from a state indicating the video buffer $200b$ having (n+1) videos to having n videos stored in video buffer $200b$ due to user $100b$ skipping viewing the current video.

In one or more embodiments, if the video buffer $200b$ is in state $212c$ such that user $100b$ is viewing a current video while there are n videos but skips viewing the current video such that the current video is deleted from the video buffer $200b$ and no video can be downloaded into video buffer $200b$ from the social media server $100c$ while the current video is being skipped, thus the state of the video buffer $200n$ moves from state $212c$ to a state in which there are (n−1) videos remain being stored in video buffer 200*b*. Thus, there is a transition probability $p_1$ 212*i* of transitioning from state 212*c* indication the video buffer 200*b* having n videos to having (n−1) videos stored in video buffer 200*b* due to user 100*b* skipping viewing the current video.

In one or more embodiments, if the video buffer 200*b* is in a state such that user 100*b* is viewing a current video while there are 3 videos stored (e.g., remaining) in video buffer 200*b* but skips viewing the current video such that the current video is deleted from the video buffer 200*b* and no video can be downloaded into video buffer 200*b* from the social media server 100*c* while the current video is being skipped, thus the state of the video buffer 200*b* moves from a state with 3 videos stored in the video buffer 200*b* to state 212*d* such that there are 2 videos remain being stored in video buffer 200*b*. Thus, there is a transition probability $p_1$ 212*j* of transitioning from state indicating the video buffer 200*b* having 3 videos to having 2 videos stored in video buffer 200*b* due to user 100*b* skipping viewing the current video.

In one or more embodiments, if the video buffer is in state 212*d* such that user 100*b* is viewing a current video while there are 2 videos but skips viewing the current video such that the current video is deleted from the video buffer 200*b* and no video can be downloaded into video buffer 200*b* from the social media server 100*c* while the current video is being skipped, thus the state of the video buffer 200*b* moves from state 212*d* to state 212*e* such that there is 1 video remain being stored in video buffer 200*b*. Thus, there is a transition probability $p_1$ 212*k* of transitioning from state 212*d* indicating the video buffer having 2 videos to having 1 video stored in video buffer 200*b* due to user 100*b* skipping the current video.

In one or more embodiments, if the video buffer is in state 212*e* such that user 100*b* is viewing a current video while there is 1 video but skips viewing the current video such that the current video is deleted from the video buffer 200*b* and no video can be downloaded into video buffer 200*b* from the social media server 100*c* while the current video is being skipped, thus the state of the video buffer 200*b* moves from state 212*e* to state 212*w* such that there are 0 videos remain being stored in video buffer 200*b*. Thus, there is a transition probability $p_1$ 212*x* of transitioning from state 212*e* indicating the video buffer having 1 video to having 0 videos stored in video buffer 200*b* due to user 100*b* skipping the current video.

In one or more embodiments, if the video buffer 200*b* is in state 212*b* such that user 100*b* is viewing a current video, while there are (r−1) videos stored in the video buffer 200*b*, for a long period time such that the current video is being deleted from the video buffer 200*b* and two videos can be downloaded into video buffer 200*b* from social media server 100*c*. Thus, there is a transition probability $p_2$ 2121 of transitioning from state 212*b* to state 212*a* because of the video buffer 200*b* going from having (r−1) videos to having r videos stored in it due to user 100*b* viewing the current video for a long period of time.

In one or more embodiments, if the video buffer 200*b* is in a state (not shown) such a user 100*b* is viewing a current video, while there are (r−2) videos stored in the video buffer, for a long period time such that the current video is being deleted from the video buffer 200*b* and two videos can be downloaded into video buffer 200*b* from social media server 100*c*. Thus, there is a transition probability $p_2$ 212*m* of transitioning from a state (not shown) to state 212*b* because the video buffer 200*b* going from having (r−2) videos to having (r−1) videos stored in it due to user 100*b* viewing the current video for a long period of time.

In one or more embodiments, if the video buffer is on state 212*c* such that a user 100*b* is viewing a current video, while there are n videos stored in the video buffer 200*b*, for a long period time such that the current video is being deleted from the video buffer 200*b* and two videos can be downloaded into video buffer 200*b* from social media server 100*c*. Thus, there is a transition probability $p_2$ 212*n* of transitioning from state 212*c* to a state (not shown) because of the video buffer 200*b* going from having n videos to having (n+1) videos stored in it due to user 100*b* viewing the current video for a long period of time.

In one or more embodiments, if the video buffer 200*b* is in a state (not shown) such that a user 100*b* is viewing a current video, while there are (n−1) videos stored in the video buffer 200*n*, for a long period time such that the current video is being deleted from the video buffer 200*b* and two videos can be downloaded into video buffer 200*b* from social media server 100*c*. Thus, there is a transition probability $p_2$ 212*o* of transitioning from a state (not shown) to state 212*c* because of the video buffer 200*b* going from having (n−1) videos to having n videos stored in it due to user 100*b* viewing the current video for a long period of time.

In one or more embodiments, if the video buffer 200*b* is in state 212*d* such that a user 100*b* is viewing a current video, while there are 2 videos stored in the video buffer 200*b*, for a long period time such that the current video is being deleted from the video buffer 200*b* and two videos can be downloaded into video buffer 200*b* from social media server 100*c*. Thus, there is a transition probability $p_2$212*p* of transitioning from state 212*d* to a state (not shown) because of the video buffer 200*b* going from having 2 videos to having 3 videos stored in it due to user 100*b* viewing the current video for a long period of time.

In one or more embodiments, if the video buffer 200*b* is in state 212*e* such that a user 100*b* is viewing a current video, while there is 1 video stored in the video buffer 200*b*, for a long period time such that the current video is being deleted from the video buffer 200*b* and two videos can be downloaded into video buffer 200*b* from social media server 100*c*. Thus, there is a transition probability $p_2$ 212*q* of transitioning from state 212*e* to state 212*d* because of the video buffer 200*b* going from having 1 video to having 2 videos stored in it due to user 100*b* viewing the current video for a long period of time.

In one or more embodiments, if the video buffer 200*b* is in state 212*w* such that a user 100*b* is viewing a current video, while there is 0 videos stored in the video buffer 200*b*, for a long period time such that the current video is being deleted from the video buffer 200*b* and 2 videos can be downloaded into video buffer 200*b* from social media server 100*c*. Thus, there is a transition probability $p_2$ 212*y* of transitioning from state 212*w* to state 212*e* because of the video buffer 200*b* going from having 0 videos to having 1 video stored in it due to user 100*b* viewing the current video for a long period of time.

In one or more embodiments, if the video buffer 200*b* is in state 212*a* such that a user 100*b* is viewing a current video, while there are r videos stored in the video buffer 200*b*, for a significant period time such that the current video is being deleted from the video buffer 200*b* and one video can be downloaded into video buffer 200*b* from social media server 100*c*. Thus, there is a transition probability $1-p_1$ 212*r* of remaining in state 212*a* because of the video buffer 200*b* going from having r videos to still having r videos stored in it due to user 100*b* viewing the current video for a significant period of time.

In one or more embodiments, if the video buffer 200*b* is in state 212*b* such that a user 100*b* is viewing a current video, while there are (r–1) videos stored in the video buffer 200*b*, for a significant period time such that the current video is being deleted from the video buffer 200*b* and one video can be downloaded into video buffer 200*b* from social media server 100*c*. Thus, there is a transition probability $1-p_1-p_2$ 212*s* of remaining in state 212*b* because of the video buffer 200*b* going from having (r–1) videos to still having (r–1) videos stored in it due to user 100*b* viewing the current video for a significant period of time.

In one or more embodiments, if the video buffer 200*b* is in state 212*c* such that a user 100*b* is viewing a current video, while there are n videos stored in the video buffer 200*b*, for a significant period time such that the current video is being deleted from the video buffer 200*b* and one video can be downloaded into video buffer 200*b* from social media server 100*c*. Thus, there is a transition probability $1-p_1-p_2$ 212*t* of remaining in state 212*c* because of the video buffer 200*b* going from having n videos to still having n videos stored in it due to user 100*b* viewing the current video for a significant period of time.

In one or more embodiments, if the video buffer 200*b* is in state 212*d* such that a user 100*b* is viewing a current video, while there are 2 videos stored in the video buffer 200*b*, for a significant period time such that the current video is being deleted from the video buffer 200*b* and one video can be downloaded into video buffer 200*b* from social media server 100*c*. Thus, there is a transition probability $1-p_1-p_2$ 212*u* of remaining in state 212*d* because of video buffer 200*b* going from having 2 videos to still having 2 videos stored in it due to user 100*b* viewing the current video for a significant period of time.

In one or more embodiments, if the video buffer 200*b* is in state 212*e* such that a user 100*b* is viewing a current video, while there is 1 video stored in the video buffer 200*b*, for a significant period time such that the current video is being deleted from the video buffer 200*b* and one video can be downloaded into video buffer 200*b* from social media server 100*c*. Thus, there is a transition probability $1-p_1-p_2$ 212*v* of remaining in state 212*e* because of the video buffer 200*b* going from having 1 video to still having 1 video stored in it due to user 100*b* viewing the current video for a significant period of time.

In one or more embodiments, if the video buffer 200*b* is in state 212*w* such that a user 100*b* is viewing a current video, while there are 0 videos stored in the video buffer 200*b*, for a significant period time such that the current video is being deleted from the video buffer 200*b* and one video can be downloaded into video buffer 200*b* from social media server 100*c*. Thus, there is a transition probability $1-p_2$ 212*z* of remaining in state 212*w* because of the video buffer 200*b* going from having 0 videos to still having 0 videos stored in it due to user 100*b* viewing the current video for a significant period of time.

In one or more embodiments, the communication device 100*a* can record viewing information associated with user 100*a*. The viewing information can comprise historical information that can include statistics to calculate the probability ($p_1$) user 100*b* skips viewing a video/views the video for a short period of time, the probability ($1-p_1-p_2$) views a video for a significant period of time, and the probability ($p_1$) views a video for a long period of time. Further, a communication device 100*a* can be configured by social media server 100*c* to have a range of values for P(z) as in equation (17) above. Example values for $p_1$, $p_2$, and P(z) are shown in Table I below for an r value equal to 10:

TABLE I

| r value | $p_1$ | $p_2$ | P(z) |
|---|---|---|---|
| 10 | 0.6 | 0.4 | 0.20234 |
| 10 | 0.55 | 0.45 | 0.01124 |
| 10 | 0.51 | 0.49 | 0.05618 |

Examples values for $p_1$, $p_2$, and r are shown in Table II for a P(z) value of around 0.05:

TABLE II

| r value | $p_1$ | $p_2$ | P(z) |
|---|---|---|---|
| 3 | 0.4 | 0.6 | 0.05 |
| 4 | 0.45 | 0.55 | 0.05 |
| 7 | 0.49 | 0.51 | 0.05 |

In one or more embodiments, Table I shows that for a range of values for $p_1$, $p_2$ with the r value being held constant at 10 videos, the values of P(z) range from around 20% to around 5%. Thus, as the values of $p_1$ and $p_2$ diverge, the value of P(z) increases. Thus, this encourages the social media server 100*c* to provide videos to a user in which $p_1$ and $p_2$ converge toward (or are close together) to each other. In further embodiments, Table II shows that for a range of values for $p_1$, $P_2$ with the P(z) value being held constant at 5%, the values of r range from 3 to 7 videos. Thus, as $p_1$ increases, the r value increases, which is as expected. That is, as user 100*b* has more of a propensity to skip videos, more videos should be initially downloaded into the video buffer 200*b* so as to make sure the probability of the video buffer having no videos left is around 5%.

In one or more embodiments, Table 1 shows that if $p_1$ and $p_2$ converge with a fixed buffer size, P(z) decreases. From a user experience perspective, the social media application 200*a* and/or the social media server 100*c* would want to serve videos to user 100*b* such that user 100*b* either skips viewing a current video immediately or view a significant portion of the current video with equal probability. In further embodiments, holding P(z) as a constant performance threshold to meet, the social media application 200*a* and/or social media server 100*c* can provide high engagement/high quality videos (e.g., $p_1$ be low and $p_2$ high) if there is limited space in video buffer 200*b* (e.g., r value to be low).

In one or more embodiments, the communication device 100*a* can calculate, utilizing software application 220*a*, the r value accordingly to equation (17) above based on the statistics of user 100*b* previously skipping videos such that no videos are downloaded to the video buffer 200*b* from social media server 100*c* and viewing videos for a long period of time such that two videos can be downloaded to the video buffer 200*b* from the social media server 100*c* while viewing the video during previous social media sessions utilizing social media application 200*a*. Further, the communication device 100*a*, when initiating a new social media session utilizing social media application 200*a*, can request a group of videos from the social media application in which the number of videos for the group of videos is at least r videos in number. In some embodiments, prior to the communication device 100*a* calculating r, the social media server 100*c* can provide the communication device 100*a* a value for P(z) (e.g., probability that the video buffer 200*b* runs out of videos and user wants to skip viewing the current video ($p_1$) i.e., the social media application 200a stalls) so as to prevent user 100b to have unpleasant, frustrating, or otherwise diminished user experience in viewing the group of videos.

In one or more embodiments, instead of the communication device 100a calculating the first group of videos based on equation (17) and requesting the first group of videos from the social media server, the social media server can perform such functions. That is, the social media server can obtain the viewing information associated with a user including the user skip probability and view probability and calculate the first group of videos based on equation (17) and then provide the first group of videos to the communication device accordingly.

Figure 2D:
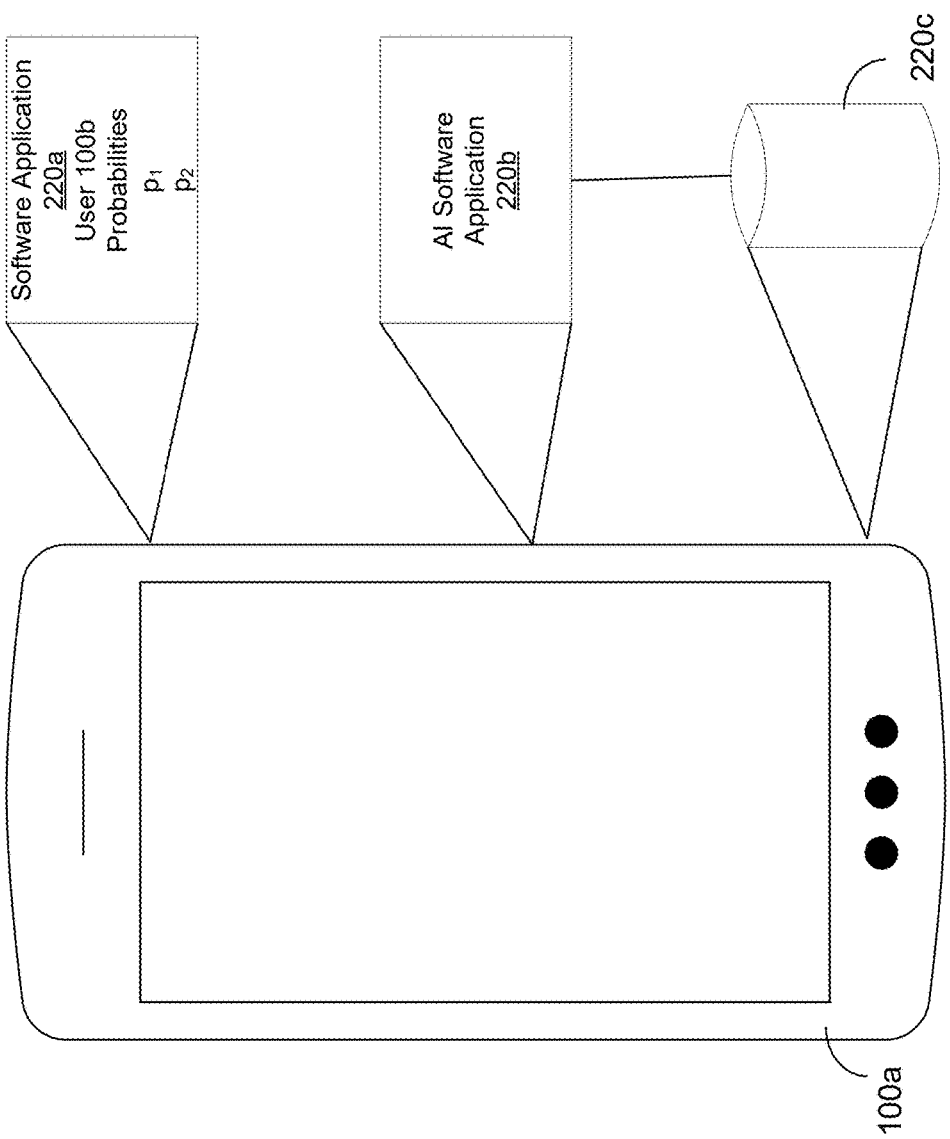

Referring to FIG. 2D, in one or more embodiments, system 220 can include communication device 100a, which includes a software application 220a, an AI software application 220b, and database 220c. The AI software application 220b can be used to determine the group of videos (e.g., the number of videos (r) associated with the group of videos), rather than relying solely on equation (17), for several reasons, including but not limited to, determining the group of videos based on incorporation of additional factors, learning from complex viewing patterns, impact from other communication functions, user personalization and user group behavior, adaptation to real-time conditions (e.g., network conditions, computing resources, memory, processor, etc.), and integration with a recommendation system.

In one or more embodiments, equation (17) provides a basis for determining the number of videos to download from social media server 100c into video buffer 200b based on skip and view probabilities and a target probability for buffer exhaustion. However, real-world user behavior and system performance can be influenced by additional factors not captured in equation (17), such as content preferences, time of day, device type, network conditions, or recent trends. The AI software application 220b can incorporate these and other contextual or behavioral factors to make more nuanced and adaptive decisions.

In one or more embodiments, AI models can learn complex, non-linear relationships from historical data (e.g., from previous social media sessions utilizing social media application 200a) that cannot be expressed in in equation (17). For example, the AI software application 220b can analyze patterns in how users interact with different genres, video lengths, or presentation orders, and adjust the group of videos (e.g., the number of video associated with the group of videos) accordingly to improve user engagement with the videos and minimize stalling due to buffer exhaustion.

In one or more embodiments, while equation (17) is based on probabilistic modeling for a given user or user group, the AI software application 220b can dynamically personalize the group of videos for each user by leveraging AI/ML models trained on individual and aggregate user data. This allows for more precise tailoring of content delivery to the unique habits and preferences of each user or user group. A consequence can be improved user engagement with one or more videos within the group of videos thereby increasing viewing (probabilities) and reducing skipping (probabilities), thereby mitigating buffer exhaustion.

In one or more embodiments, the AI software application 220b can respond to real-time changes in device resources, network bandwidth, or user context, which may not be immediately reflected in the static parameters of equation (17). By continuously monitoring and adapting to these conditions, the AI can adjust the group of videos (e.g., adjust the number of videos associated with the group of videos) to maintain or improve user experience.

In one or more embodiments, the group of videos to be buffered is not only a function of buffer management but also of content recommendation. The AI software application 220b can integrate recommendation algorithms with buffer optimization, ensuring that the selected videos are both likely to be of interest to the user and sufficient in number to prevent stalling.

In one or more embodiments, while equation (17) provides a robust basis for determining the number of videos in a group of videos requested by communication device 100a to buffer based on skip/view probabilities and a target stalling probability, the AI software application 220b enables a more flexible, adaptive, and personalized approach. It can account for a broader range of factors, learned from complex data, and dynamically adjust to changing conditions, thereby enhancing both the efficiency of video delivery and the quality of the user experience.

In one or more embodiments, the AI software application 220b can implement one or more AI models and/or ML models stored in database 220c (e.g., or any other information repository or storage device). The AI software application 220b can utilize one or more of the AI/ML models to determine or adjust the number r value calculated from equation (17) or otherwise adjust the number of video associated with the group of videos requested from the social media server 100c.

In one or more embodiments, the AI software application 220c can determine available computer resources associated with the communication device 100a. Computer resources can include, but are not limited to, the processing capacity and/or memory capacity of the communication device 100a. Further, the AI software application 220b can select one or more AI/ML models stored in database 220c based on the available computer resources. This allows for the communication device 100a function efficiently and avoiding overloading the communication device 100a to inhibit its performance thereby diminishing the user experience. In further embodiments, each AI/ML model can be associated with a computer resource threshold (e.g., a processing capacity threshold, a memory capacity threshold). The AI software application 220b can determine whether the available computer resources satisfy the computer resource threshold, and if so, select an AI/ML model(s) associated with the computer resources threshold. If the available computer resources do not satisfy the computer resources threshold, then the associated AI/ML model is not selected. This avoids the AI software application 220b selecting an AI/ML model that can overload the communication device 100a, thereby inhibiting its performance and diminishing the user experience.

Figure 2E:
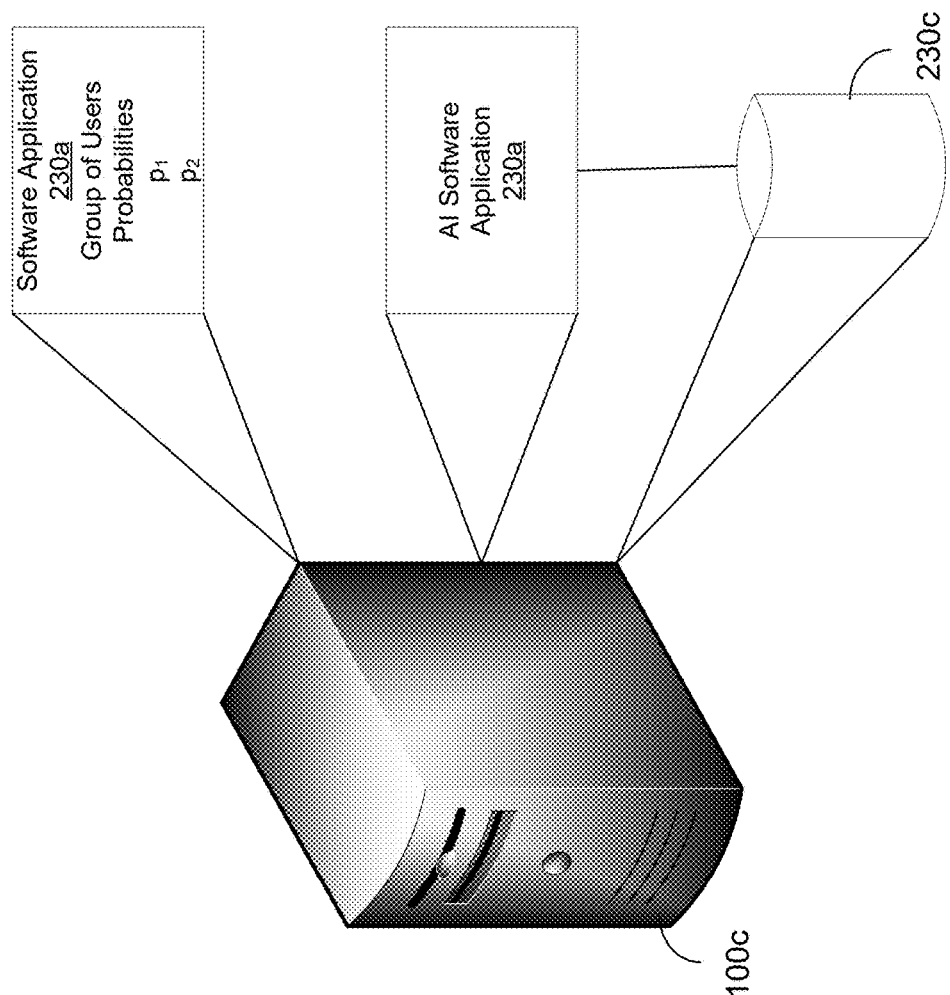

Referring to FIG. 2E, in one or more embodiments, system 230 can comprise social media server 100c, which includes software application 230a, AI software application 230a, and database 230c. The software application 230a can configure, manage, and process user group-level viewing information on the social media server 100c. Specifically, software application 230a can obtain, store, and calculate probabilities associated with a group of users, such as the probability that a user within the group of users skips viewing a video ($p_1$) and the probability that a user within the group of users views a video ($p_2$). These probabilities can be used in conjunction with value(s) of P(z) to calculate a value for r according to equation (17) above to provide a group of videos to communication device 100a (e.g., the number of videos associated with the group of videos is r). That is, the social media server 100c can receive a request for a group of videos with a number of videos of r (e.g., r') as calculated by the software application 220a on communication device 100a based on the $p_1$ and $P_2$ associated with user 100b. However, social media server 100c can calculate a value for r (e.g., r") based on the $p_1$ and $p_2$ associated with a group of users. This group of users can be users that have a similar demographic profile (e.g., age, geographic region, preferences, etc.) as user 100b. Further, user 100b may be a relatively new user such that its values for $p_1$ and $p_2$ may not be accurate or precise. Based on such factors, the social media server 100c can provide a group of videos such that the number of videos for them is r".

In one or more embodiments, software application 230a may aggregate and analyze viewing data from multiple users to generate the group-level probabilities $p_1$ and $p_2$. In further embodiments, the social media server 100c can utilize this information to calculate r". In other embodiments, this information can then be accessed by communication device 100a over communication network 100e to inform their video buffering and presentation strategies (e.g., calculate r').

In one or more embodiments, the AI software application 230b can implement AI/ML models on the social media server 100c to enhance determining and improving video content delivery. The AI software application 230b utilizes data stored in the database 230c, including historical user and group viewing information, to analyze complex patterns and make adaptive decisions regarding the selection and number of videos to be provided to communication device 100a.

In one or more embodiments, the AI software application 230b can process both individual and group-level viewing probabilities, such as the probability that a user or group of users skips viewing a video ($p_1$) and the probability that a user or group of users views a video ($p_2$). By leveraging AI/ML models, the AI software application 230b can dynamically adjust the number of videos (r/r") within the group of videos to be downloaded from social media server 100c and buffered by communication device 100a, taking into account additional factors such as user preferences, device capabilities, network conditions, and real-time behavioral trends.

In one or more embodiments, the AI software application 230b can personalize content delivery for different users or groups of users, improve resource allocation, and integrate recommendation algorithms with buffer management strategies. This results in a more efficient, adaptive, and user-centric video delivery system that goes beyond static, equation-based approaches to determining the number of videos within the group of videos.

In one or more embodiments, the AI software application 230b can implement one or more AI models and/or ML models stored in database 230c (e.g., or any other information repository or storage device). The AI software application 230b can utilize one or more of the AI/ML models to determine or adjust the number r value calculated from equation (17) or otherwise adjust the number of videos associated with the group of videos requested from the social media server 100c.

In one or more embodiments, the AI software application 230b can determine available computer resources associated with the communication device 100a. Computer resources can include, but are not limited to, the processing capacity and/or memory capacity of the communication device 100a. Further, the AI software application 230b can select one or more AI/ML models stored in database 230c based on the available computer resources. This allows for the social media server 100c to function efficiently and avoiding overloading the social media server 100c to inhibit its performance thereby diminishing the user experience on multiple mobile devices accessing the social media server 100c. In further embodiments, each AI/ML model can be associated with a computer resource threshold (e.g., a processing capacity threshold, a memory capacity threshold). The AI software application 230b can determine whether the available computer resources satisfy the computer resource threshold, and if so, select an AI/ML model(s) associated with the computer resources threshold. If the available computer resources do not satisfy the computer resources threshold, then the associated AI/ML model is not selected. This avoids the AI software application 230b selecting an AI/ML model that can overload the social media server 100c, thereby inhibiting its performance and diminishing the user experience on the multiple devices accessing social media server 100c.

Figure 3A:
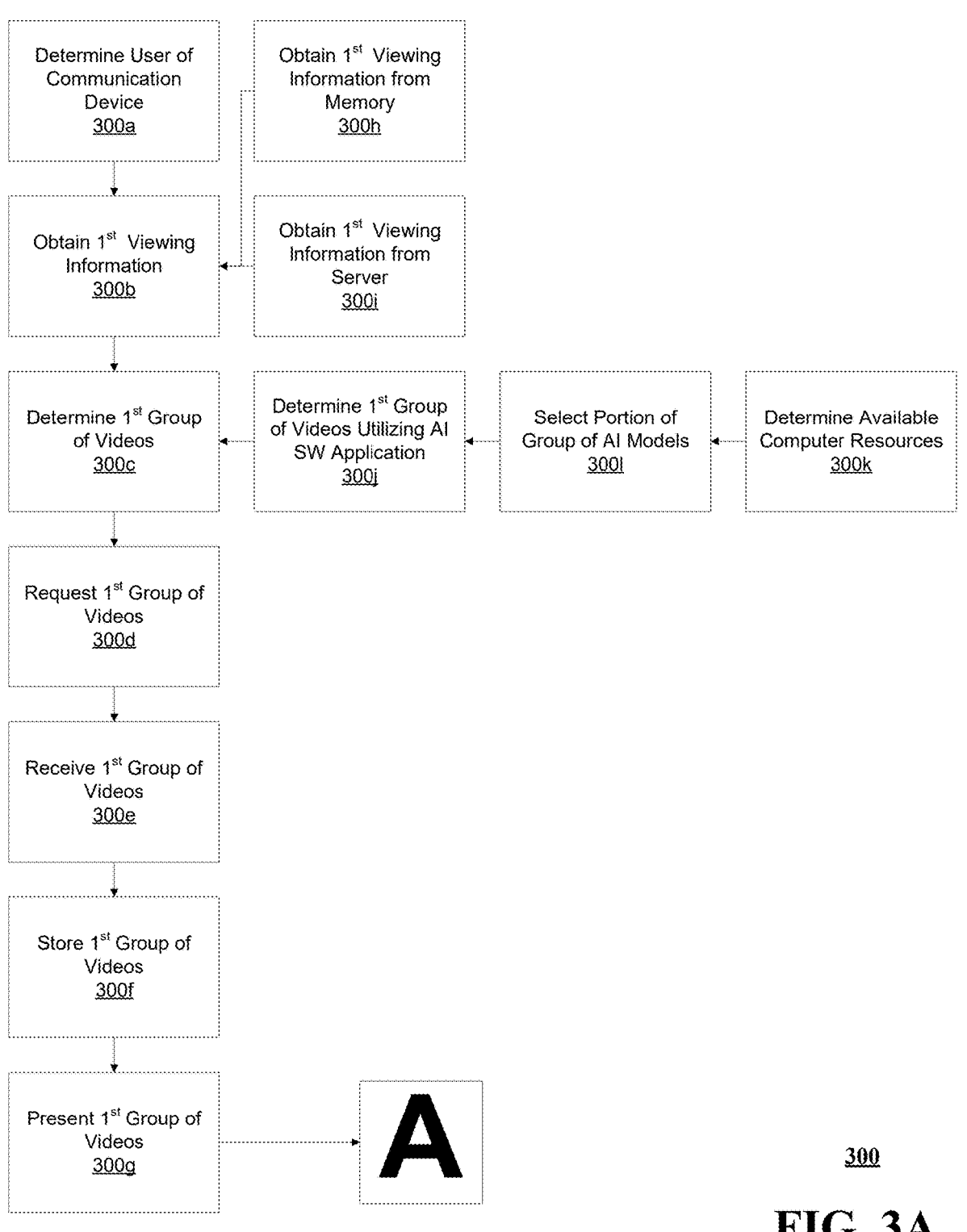
FIG. 3A, FIG. 3B, FIG. 3C, FIG. 3D, and FIG. 3E depict illustrative embodiments of methods in accordance with various aspects described herein.

FIGS. 3A-3E depict illustrative embodiments of methods in accordance with various aspects described herein. Referring to FIG. 3A, in one or more embodiments, aspects of method 300 can be implemented by a communication device (e.g., communication device 100a). The method 300 can include the communication device, at 300a, determining a user of the communication device. In some embodiments, a user profile associated with the communication device can be activated and determining the user can include determining the user profile that is activated. In other embodiments, the communication device can prompt the user to provide user-generated input that indicates the user and then receives such user-generated input accordingly. Further, the method 300 can include the communication device, at 300b, obtaining first viewing information associated with the user based on the determining of the user. In some embodiments, any viewing information can be stored on the communication device and can be obtained based on a user profile or can be associated with a user. In other embodiments, any viewing information can be stored on a social media server or database and can be obtained by indicated the user and the social media server or database can provide the viewing information accordingly. The first viewing information comprises a first probability indicating a probability that a user skips viewing a video. Also, the first viewing information comprises a second probability that a user views an entire video (or a significant or substantial portion thereof). In addition, the method 300 can include the communication device, at 300c, determining a first group of videos to request from a server based on the first probability and the second probability. A first number of videos of the first group of videos is calculated according to a first equation (e.g., formula) comprising $[(\log_{10}(1-[(p_1-p_2)/P(z)])/\log_{10}(p_2 p_1)]-1$, wherein $p_1$ is equal to the first probability, wherein $p_2$ is equal to the second probability, and wherein P(z) is a probability of no videos are stored in a video buffer of the communication device and the user skips viewing the current video ($p_1$) being left with an undesirable user experience (e.g. waiting for more videos to be downloaded into video buffer from the social media server). Also, the method 300 can include the communication device, at 300d, requesting, over a communication network, the first group of videos from a server. Further, the method 300 can include the communication device, at 300e, receiving, over the communication network, the first group of videos from the (social media) server. In addition, the method 300 can include the communication device, at 300f, storing the first group of videos in the video buffer on the communication device. Also, the method 300 can include the communication device, at 300g, presenting a first video from the first group of videos to the user on a display of the communication device. In some embodiments, the first group of videos can be associated with a social media application such that the social media application on the communication device can present the first video (or any video stored in the video buffer). In further embodiments, the server can comprise a social media server.

In one or more embodiments, the first viewing information is stored in a memory of the communication device. Further, the method 300 can include the communication device, at 300h, obtaining the first viewing information from the memory. In some embodiments, the obtaining of the first viewing information comprises obtaining the first viewing information from the memory of the communication device. In further embodiments, the first viewing information is stored in a memory of the server. In addition, the method 300 can include the communication device, at 300i, obtaining, over the communication network, the first viewing information from the server. In additional embodiments, the obtaining of the first viewing information comprises obtaining, over the communication network, the first viewing information from the server.

In one or more embodiments, the method 300 can include the communication device, at 300j, determining the first group of videos utilizing an AI software application. In some embodiments, the determining of the first group of video comprises determining the first group of videos utilizing the AI software application. In some embodiments, the AI software application can determine the first group of videos based on equation (17) in conjunction with additional factors (as described herein). In other embodiments, the AI software application can determine the first group of videos based on equation (17). The AI software application implements a portion of a group of AI models. Further, the method 300 can include the communication device, at 300k, determining available computer resources associated with the communication device. In addition, the method 300 can include the communication device, at 300l, selecting the portion of the group of AI models based on the available computer resources. The portion of the group of AI models comprises one or more of the group of AI models.

Figure 3B:

Referring to FIG. 3B, in one or more embodiments, aspects of method 310 can be implemented by a communication device. Further, the method 310 can include the communication device, at 310b, obtaining, over the communication network, second viewing information associated with a group of users from the server. The second viewing information comprises a third probability indicating a probability that the group of users skips viewing a video, and the second viewing information comprises a fourth probability that the group of users views an entire video. In addition, the method 310 can include the communication device, at 310c, determining a second group of videos to request from the server based on the third probability and the fourth probability. A second number of videos of the second group of videos is calculated according to a second equation (e.g., formula) comprising $[(\log_{10}(1-[(p_3-p_4)/P(z)])/\log_{10}(p_4 p_3)]-1$, wherein $p_3$ is equal to the third probability, wherein $p_4$ is equal to the fourth probability, wherein the P(z) is the probability of no videos are stored in the video buffer of the communication device and the user skips viewing the current video ($p_3$). Also, the method 310 can include the communication device, at 310d, requesting, over the communication network, the second group of videos from the server. Further, the method 310 can include the communication device, at 310e, receiving, over the communication network, the second group of videos from the server. In addition, the method 310 can include the communication device, at 310f, storing the second group of videos in the video buffer on the communication device. Also, the method 310 can include the communication device, at 310g, presenting a first video from the second group of videos to the user on the display of the communication device.

In one or more embodiments, the method 310 can include the communication device, at 310j, determining the second group of videos utilizing the AI software application. In some embodiments, the determining of the second group of video comprises determining the second group of videos utilizing the AI software application. In other embodiments, the group of videos can be determined according to equation (17), $p_3$, and $p_4$ in conjunction with additional factors (as described herein). The AI software application implements a portion of a group of AI models. Further, the method 310 can include the communication device, at 310k, determining available computer resources associated with the communication device. In addition, the method 310 can include the communication device, at 310l, selecting the portion of the group of AI models based on the available computer resources. The portion of the group of AI models comprises one or more of the group of AI models.

Figure 3C:

Referring to FIG. 3C, in one or more embodiments, aspects of method 320 can be implemented by a communication device. The method 320 can include the communication device, at 320a, determining a user of the communication device. Further, the method 320 can include the communication device, at 320b, obtaining first viewing information associated with the user. The first viewing information comprises a first probability indicating a probability that a user skips viewing a video. Also, the first viewing information comprises a second probability that a user views an entire video. In addition, the method 320 can include the communication device, at 320c, determining a first group of videos to request from a server based on the first probability and the second probability. A first number of videos of the first group of videos is calculated according to an equation (e.g., formula) comprising $[(\log_{10}(1-[(p_1-p_2)/P(z)])/\log_{10}(p_2 p_1)]-1$, wherein $p_1$ is equal to the first probability, wherein $p_2$ is equal to the second probability, wherein P(z) is a probability of no videos are stored in a video buffer of the communication device and the user skips viewing the current video ($p_1$).

In one or more embodiments, the method 320 can include the communication device, at 320d, obtaining, over the communication network, second viewing information associated with a group of users from the server. The second viewing information comprises a third probability indicating a probability that the group of users skips viewing a video, and the second viewing information comprises a fourth probability that the group of users views an entire video. In addition, the method 320 can include the communication device, at 320e, determining a second group of videos to request from the server based on the third probability and the fourth probability. A second number of videos of the second group of videos is calculated according to a second equation comprising $[(\log_{10}(1-[(p_3-p_4)/P(z)])/\log_{10}(p_4/p_3)]-1$, wherein $p_3$ is equal to the third probability, wherein $p_4$ is equal to the fourth probability, wherein the P(z) is the probability of no videos are stored in the video buffer of the communication device and the user skips viewing the current video ($p_3$).

In one or more embodiments, the method 320 can include the communication device, at 320f, determining one or more network conditions of the communication network. Network conditions can include, but are not limited to, available bandwidth, network latency, network congestion, network delay, packet loss, number of packet retransmissions, and/or any other networks conditions. Such network conditions can be determined by software applications that can send test packets roundtrip between the communication device and the server and recording the roundtrip times, thereby determining network conditions based on the recorded roundtrip times. Further, the method 320 can include the communication device, at 320g, determining the available computer resources of the communication devices. The computer resources can include the processing capacity, memory capacity, etc. In addition, the method 320 can include the communication device, at 320h, selecting a third group of videos from one of the first group of videos and the second group of videos based on at least one of the first group of videos, the second group of videos, the one or more network conditions, and/or the available computer resources of the communication device In one or more embodiments, the method 320 can include the communication device, at 320i, requesting, over a communication network, the third group of videos from a server. Further, the method 320 can include the communication device, at 320j, receiving, over the communication network, the third group of videos from the server. In addition, the method 320 can include the communication device, at 320k, storing the third group of videos in a video buffer on the communication device. Also, the method 320 can include the communication device, at 320l, presenting a video from the third group of videos to the user on a display of the communication device.

In one or more embodiments, the method 320 can include the communication device, at 320o, determining the first group of videos utilizing an AI software application. In some embodiments, the determining of the first group of video comprises determining the first group of videos utilizing the AI software application. In some embodiments, the first group of videos can be determined by the AI software application based on equation (17) in conjunction with additional factors (as described herein). The AI software application implements a portion of a group of AI models. Further, the method 320 can include the communication device, at 320m, determining available computer resources associated with the communication device. In addition, the method 320 can include the communication device, at 320n, selecting the portion of the group of AI models based on the available computer resources. The portion of the group of AI models comprises one or more of the group of AI models.

In one or more embodiments, the method 320 can include the communication device, at 320r, determining the second group of videos utilizing the AI software application. In some embodiments, the determining of the second group of video comprises determining the second group of videos utilizing the AI software application. In some embodiments, the first group of videos can be determined by the AI software application based on equation (17) in conjunction with additional factors (as described herein). The AI software application implements a portion of a group of AI models. Further, the method 320 can include the communication device, at 320p, determining available computer resources associated with the communication device. In addition, the method 320 can include the communication device, at 320q, selecting the portion of the group of AI models based on the available computer resources. The portion of the group of AI models comprises one or more of the group of AI models.

Figure 3D:
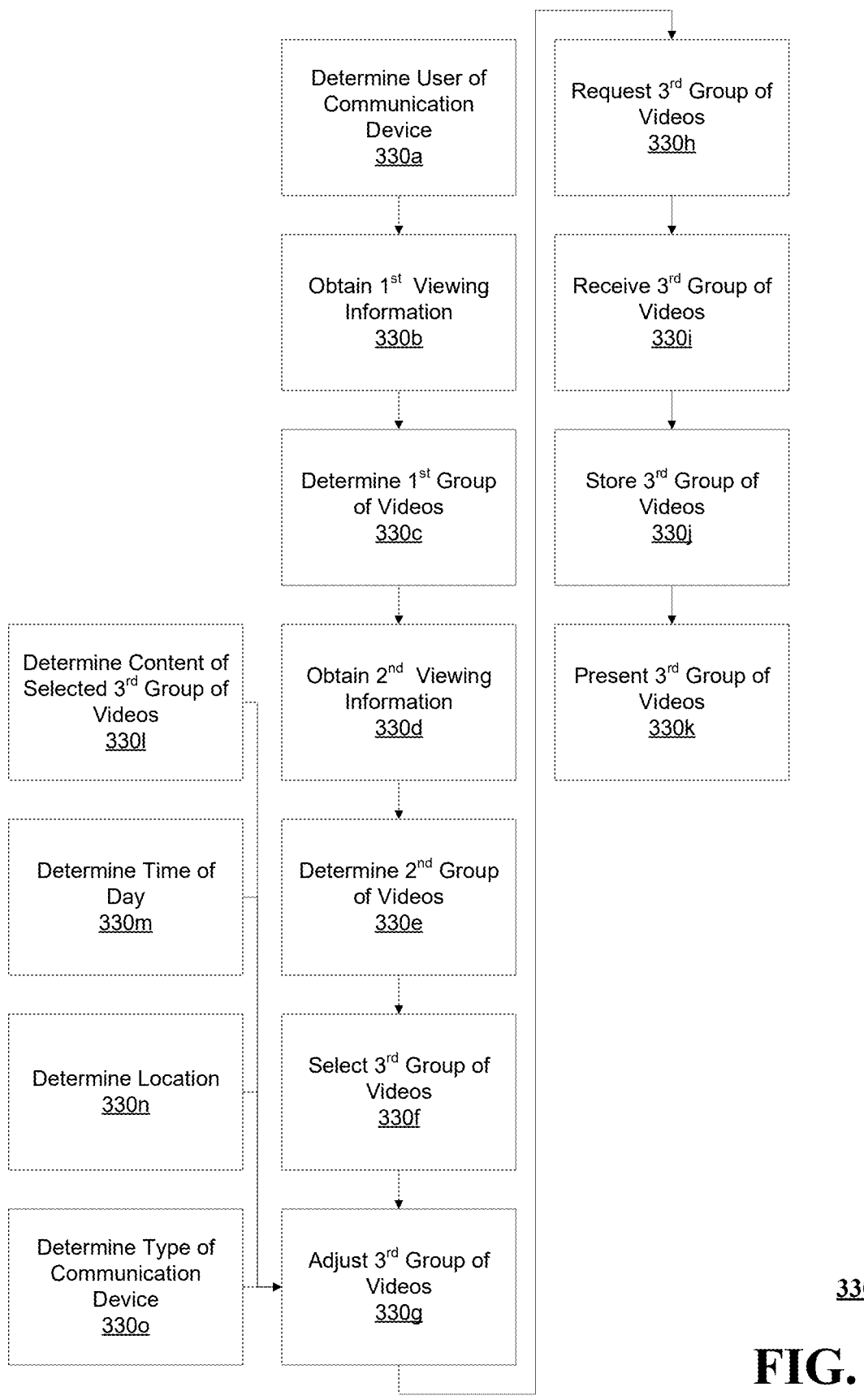

Referring to FIG. 3D, in one or more embodiments, aspects of method 330 can be implemented by a communication device. The method 330 can include the communication device, at 330a, determining a user of the communication device. Further, the method 330 can include the communication device, at 330b, obtaining first viewing information associated with the user. The first viewing information comprises a first probability indicating a probability that a user skips viewing a video. Also, the first viewing information comprises a second probability that a user views an entire video. In addition, the method 330 can include the communication device, at 330c, determining a first group of videos to request from a server based on the first probability and the second probability. A first number of videos of the first group of videos is calculated according to a first equation comprising $[(\log_{10}(1-[(p_1-p_2)/P(z)])/\log_{10}(p_2 \ p_1)]-1$, wherein $p_1$ is equal to the first probability, wherein $p_2$ is equal to the second probability, wherein $P(z)$ is a probability of no videos are stored in a video buffer of the communication device and the user skips viewing the current video $(p_1)$.

In one or more embodiments, the method 330 can include the communication device, at 330d, obtaining, over the communication network, second viewing information associated with a group of users from the server. The second viewing information comprises a third probability indicating a probability that the group of users skips viewing a video, and the second viewing information comprises a fourth probability that the group of users views an entire video. In addition, the method 330 can include the communication device, at 330e, determining a second group of videos to request from the server based on the third probability and the fourth probability. A second number of videos of the second group of videos is calculated according to a second equation comprising $[(\log_{10}(1-[(p_3-p_4)/P(z)])/\log_{10}(p_4 \ p_3)]-1$, wherein $p_3$ is equal to the third probability, wherein $p_4$ is equal to the fourth probability, wherein the $P(z)$ is the probability of no videos are stored in the video buffer of the communication device and the user skips viewing the current video $(p_3)$.

Also, the method 330 can include the communication device, at 330f, selecting a third group of videos from one of the first group of videos and the second group of videos. In some embodiments, the selecting of the third group of videos can be based on the available computer resources on the communication devices. In other embodiments, the selecting of the third group of videos can be based on one or more network conditions of the communication network. In other embodiments, the selecting of the third group of videos can be including selecting a portion of the first group of videos and a portion of the second group of videos and the available computer resources on the communication device. That is, for example, the available of computer resources for the communication device can be 1 GB. Each of the first group of videos and the second group of videos can be ranked based on popularity (e.g., social media "likes"). The portion of the most popular videos from the first group of videos and the second group of videos can be selected in which the selected group of videos combined still take up less than 1 GB in memory.

In one or more embodiments, the method 330 can include the communication device, at 330g, adjusting the third group of videos based on one or more factors. In some embodiments, the adjusting of the third group of videos can be done utilizing the AI software application. The one or more factors can include, but not limited to, content of each of the third group of videos, time of day, location, and type of communication device. Further, the method 330 can include the communication device, at 3301, determining content of each of a portion of the third group of videos. In addition, the method 330 can include the communication device, at 330*m*, determining the time of day. Also, the method 330 can include the communication device, at 330*n*, determining the location of the communication device. Also, the method 330 can include the communication device, at 330*o*, determining a type of communication device. The type of communication device can include a mobile phone, smartphone, mobile device, tablet computer, laptop computer, desktop computer, wearable device, smart television, or any other communication device.

In one or more embodiments, the method 330 can include the communication device, at 330*h*, requesting, over a communication network, the third group of videos from a server. Further, the method 330 can include the communication device, at 330*i*, receiving, over the communication network, the third group of videos from the server. In addition, the method 330 can include the communication device, at 330*j*, storing the third group of videos in a video buffer on the communication device. Also, the method 330 can include the communication device, at 330*k*, presenting a video from the third group of videos to the user on a display of the communication device.

Figure 3E:
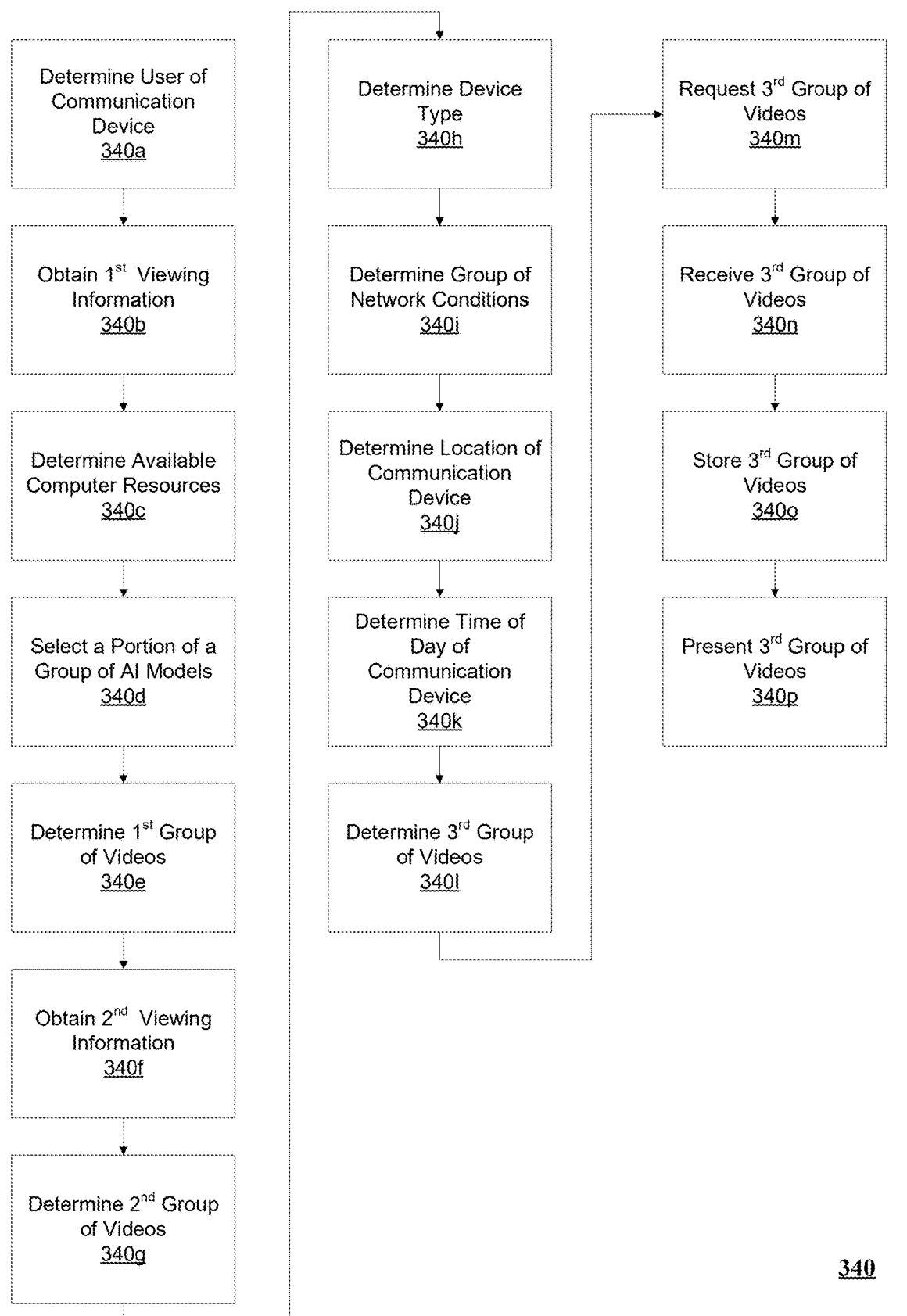

Referring to FIG. 3E, in one or more embodiments, method 340 can be implemented by a communication device (e.g., communication device 100*a* can comprise a mobile device), and/or a social media server 100*c*. The method 340 can include the communication device, at 340*a*, determining a user of the communication device. Further, the method 340 can include the communication device, at 340*b*, obtaining first viewing information associated with the user. The viewing information can comprise information associated with the user in viewing social media videos on social media application 200*a*. The first viewing information comprises a first probability indicating a probability that a user skips viewing a video (e.g., views a small amount of the video) such that no videos can be downloaded from the social media server 100*c* into the video buffer of the communication device, and the first viewing information comprises a second probability that a user views an entire video or a significant amount of the video such that two videos can be downloaded from the social media server 100*c* into the video buffer of the communication device.

In one or more embodiments, the method 340 can include the communication device, at 340*c*, determining available computer resources associated with the communication device. Further, the method 340 can include the communication device, at 340*d*, selecting a portion of a group of AI models based on the available computer resources. The portion of the group of AI models comprises one or more of the group of AI models.

In one or more embodiments, the method 340 can include the communication device, at 340*e*, determining a first group of videos to request from a server based on the first probability and the second probability utilizing an AI software application. Further, the AI software application implements the portion of the group of AI models. A first number of videos of the first group of videos is calculated according to a first equation (e.g., formula) comprising $[(\log_{10}(1-[(p_1-p_2)/P(z)])/\log_{10}(p_2\ p_1)]$-1, where $p_1$ is equal to the first probability, where $p_2$ is equal to the second probability, and where P(z) is a probability of no videos are stored in a video buffer of the communication device and the user skips viewing the current video ($p_1$).

In one or more embodiments, the method 340 can include the communication device, at 340*f*, obtaining, over a communication network (e.g., communication network 100*e*), second viewing information associated with a group of users from social media server 100*c*. The second viewing information comprises a third probability indicating a probability that the group of users skips viewing a video (e.g., views a small amount of the video) such that no videos can be downloaded from the social media server 100*c* into the buffer of the communication device, and the second viewing information comprises a fourth probability that the group of users views an entire video or a significant amount of the video such that two videos can be downloaded from the social media server 100*c* into the video buffer of the communication device;

In one or more embodiments, the method 340 can include the communication device, at 340*g*, determining a second group of videos to request from the social media server based on the third probability and the fourth probability utilizing the AI software application. A second number of videos of the second group of videos is calculated according to a second equation comprising $[(\log_{10}(1-[(p_3-p_4)/P(z)])/\log_{10}(p_4\ p_3)]$-1, where $p_3$ is equal to the third probability, where $p_4$ is equal to the fourth probability, and wherein the P(z) is the probability of no videos are stored in the video buffer of the communication device and the user skips viewing the current video ($p_3$). In some embodiments the P(z) can be provided by the server to the communication device. The P(z) can be configured on the server by personnel associated with the social media application, the social media server, and/or the operator of the social media application/social media server. In other embodiments the P(z) can be determined by the AI software application on the communication device based on historical usage of the social media application by the user. For example, historically, a user may no longer utilize a social media application if the P(z) is greater than 5% but would continue to utilize the social media application if the P(z) is less than 5%. In further embodiments the P(z) can be determined by the AI software application on the server and provided to the communication device. Further, the P(z) can be based on historical usage of the social media application by a group of users. For example, historically, the group of users (e.g., on average) may no longer utilize a social media application if the P(z) is greater than 3% but would continue to utilize the social media application if the P(z) is less than 3%.

In one or more embodiments, the method 340 can include the communication device, at 340*h*, determining a device type associated with the communication device. The device type can comprise a mobile phone, smartphone, mobile device, tablet computer, laptop computer, desktop computer, wearable device, smart television, or any other communication device. In some embodiments, the AI software application can determine a user of a mobile device may be more likely to skip viewing a video, while a user of a smart television may be more likely to view an entire video or a significant amount of the video. Further, the method 340 can include the communication device, at 340*i*, determining a group of network conditions associated with the communication network. The group of network conditions can comprise available bandwidth, network latency, network congestion, network delay, packet loss, number of packet retransmissions, and/or any other networks conditions. In addition, the method 340 can include the communication device, at 340*j*, determining a location of the communication device. Also, the method 340 can include the communication device, at 340*k*, determining a time of day associated with the communication device. In some embodiments, location and time of day can be used together by the AI software application to determine that a user located in their office at 10:52 am on a weekday is more likely to skip viewing a video as the user has limited time to view videos (e.g., the AI software application can access to the user's calendar software application on the communication device and determines they have a work meeting at 11 am and only has 8 minutes to view social media videos), while a user located in their home at 10:52 am on a weekday is more likely to view an entire video has they have more time to view social media videos (e.g., AI software application can access the user's calendar software application on the communication device and determine they have no meetings or appointments during the day).

In one or more embodiments, the method 340 can include the communication device, at 3401, determining a third group of videos to request from the server based on the first group of videos, the second group of videos, the device type associated with the communication device, the group of network conditions, the location of the communication device, the time of day associated with the communication device, and the available computer resources associated with the communication device utilizing the AI software application. In some embodiments, the third group of videos can be an overlap of the first group of videos and the second group of videos. In other embodiments, the third group of videos can be a combination of a subset of the first group of videos and subset of the second group of videos. In further embodiments, the third group of videos can be the same number of videos of the first group of videos, the same number of videos as the second group of videos, a number of videos in between of the number of videos associated with the first group of videos and the number of videos associated with the second group of videos, a different number of videos from the number of videos associated with the first group of videos or the number of videos associated with the second group of videos. Further, the method 340 can include the communication device, at 340m, requesting, over a communication network, the third group of videos from a social media server. In addition, the method 340 can include the communication device, at 340n, receiving, over the communication network, the third group of videos from the social media server. Also, the method 340 can include the communication device, at 340o, storing the third group of videos in the video buffer of the communication device. Further, the method 340 can include the communication device, at 340p, presenting a first video from the third group of videos to the user on a display of the communication device utilizing a social media software application associated with the social media server.

While for purposes of simplicity of explanation, the respective processes are shown and described as a series of blocks in FIGS. 3A-3E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. One or more blocks in FIGS. 3A-3E can be performed in response to one or more blocks.

Portions of some embodiments can be combined with portions of other embodiments.

Although embodiments described herein discuss applying to equation (17) to videos, equation (17) and the embodiments described herein can be applied to video content, audio content (e.g., songs), still images, image content, virtual reality content, augmented reality content, cross-reality content, or any other media content.

Figure 5:
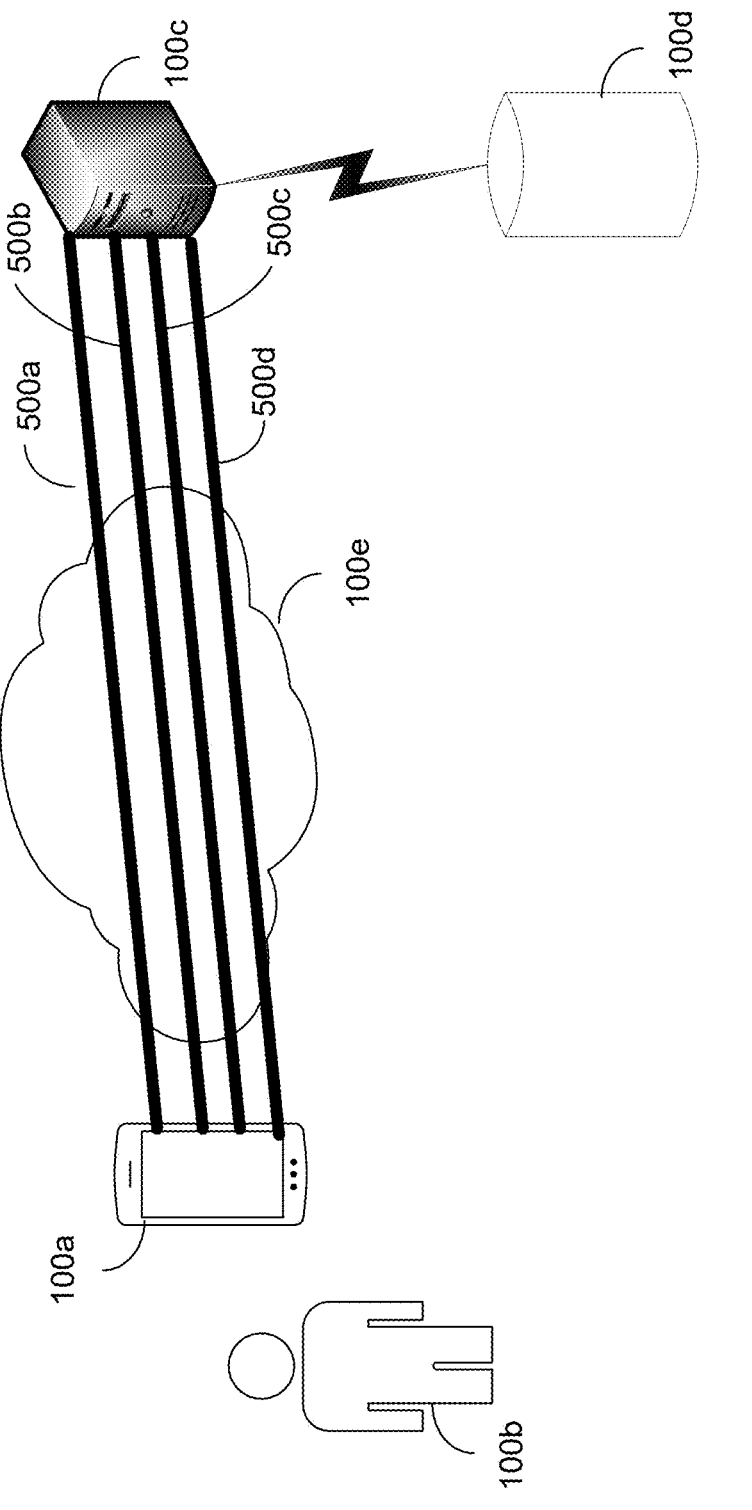
FIG. 5 is a block diagram an illustrating exemplary, non-limiting embodiment of providing video content to a communication device in accordance with various aspects described herein.

FIG. 5 is a block diagram an illustrating exemplary, non-limiting embodiment of providing video content to a communication device in accordance with various aspects described herein. In one or more embodiments, system 500 includes all the components of system 100 but shows several different communication links between server 100c and communication device 100a over communication network 100e. These communication links can include communication link 500a, communication link 500b, communication link 500c, and communication link 500d. Although only four communication links are shown, a person of ordinary skill in the art would recognize that there can be several more or several less communication links between server 100c and communication device 100a. The communication links can be wired communication links (e.g., Ethernet, fiber optic, cable, etc.), wireless communication links (e.g., Wi-Fi, cellular, satellite, etc.), logical communication links (e.g., Transport Control Protocol(TCP)/Internet Protocol(IP) communication link), or a combination thereof.

In one or more embodiments, the server 100c can select one or more of the communication links over which to send social media content to communication device 100a based on network conditions associated with the communication links. In some embodiments, the social media content can be packetized into a group of packets such that a first portion of the group of packets can be sent over one communication link and a second portion of the group of packets can be sent over another communication link. In other embodiments, the server can determine, as described herein, to send a group of social media videos (e.g., r) and such that a first portion of the group of social media videos can be sent over one communication link and a second portion of the group of social media videos can be sent over another communication link.

In one or more embodiments, each of communication link 500a, communication link 500b, communication link 500c, and communication link 500d can have differing probability of availability (e.g., too congested to handle the additional data traffic due to the social media content). Further, each of communication link 500a, communication link 500b, communication link 500c, and communication link 500d can have differing probability of the social media content (or a portion thereof) to be successfully transmitted over a communication link even if it is available (e.g., due to packet loss, interference, etc.).

In one or more embodiments, if the server 100c selects two communication links, communication link 500a and communication link 500b and there are 4 social media video that are to be downloaded to communication device (e.g., r=4 as described herein), let $q_i$=probability that communication link 500a is available and $w_i$=the probability that a social media video is successfully transmitted over communication link 500a, let $q_2$=probability that communication link 500b is available and $w_2$=the probability that a social media is successfully transmitted over communication link 500b. Then:

$$P(\text{Successfully Transmit a Video}) = q_1 w_1 + (1-q_1) q_2 w_2 = A \quad (18)$$

$$P(\text{Unsuccessfully Transmit a Video}) = q_1(1-w_1) + (1-q_1)q_2(1-w_2) + (1-q_1)(1-q_2) = B = q_1(1-w_1) + (1-q_1)q_2(1-w_2) \quad (19)$$

$$B = 1 - A \quad (20)$$

For example, to successfully transmit all four videos (e.g., r=4)=W

(21) P(W with no unsuccessful transmission)=$A^4$

(22) P(W with 1 unsuccessful transmission): $5A^4B$

(23) P(W with 2 unsuccessful transmission): $15A^4B^2$

(24) P(W with 3 unsuccessful transmission): . . . .

Thus, after determining a number of videos (e.g., r) to send to communication device 100a, server 100c can determine $p_1$, $w_1$, $p_2$, and $w_2$ based on historical data and determine a successful transmission threshold for A (e.g., A') and an unsuccessful transmission threshold for B (e.g., B') and select two of group of communication links (e.g., communication link 500a, communication link 500b, communication link 500c, and communication link 500d) based on whether A satisfies A' and/or B satisfies B'.

Figure 4:
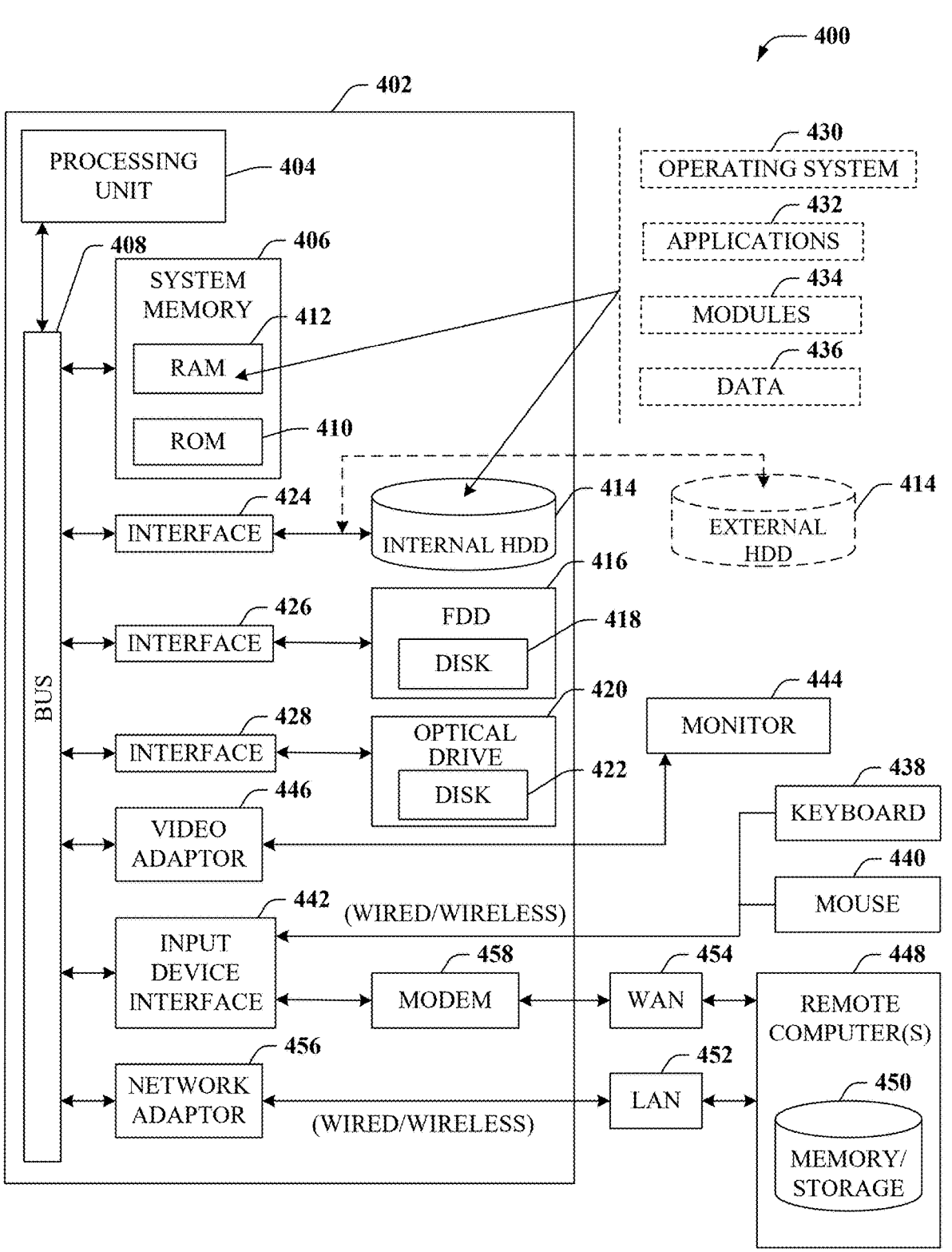
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, computing environment 400 can facilitate in whole or in part providing video content to a communication device. Each of communication device 100a, server 100c, database 100d, database 220c, and database 230c can comprise aspects of computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A communication device, comprising:

a processing system including a processor; and a memory that stores executable instructions that, when executed by the processing system, facilitate performance of operations, the operations comprising:

determining a user associated with the processing system;

obtaining first viewing information associated with the user, wherein the first viewing information comprises a first probability indicating a probability that a user skips viewing a video, wherein the first viewing information comprises a second probability that a user views an entire video;

determining available computer resources associated with the processing system;

selecting a portion of a group of artificial intelligence (AI) models based on the available computer resources, wherein the portion of the group of AI models comprises one or more of the group of AI models;

determining a first group of videos to request from a server based on the first probability and the second probability utilizing an AI software application, wherein the AI software application implements the portion of the group of AI models, wherein a first number of videos of the first group of videos is calculated according to an equation comprising $$[(\log 10(1-[(p1-p2)/P(z)])/\log 10(p2/p1)]-1,$$

wherein p1 is equal to the first probability, wherein p2 is equal to the second probability, wherein P(z) is a probability of no videos are stored in a video buffer of the processing system and the user skips viewing a current video;

requesting, over a communication network, the first group of videos from a server, wherein the server selects first communication link and a second communication link from a group of communication links to transmit the first group of videos based on a probability to successfully transmit a video from the first group of videos is less than successful transmission threshold and a probability to unsuccessfully transmit the video from the first group of videos satisfies an unsuccessful transmission threshold, wherein the probability to successfully transmit the video from the first group of videos is according to an equation $$q_1 w_1+(1-q_1)q_2 w_2=A$$

and the probability to unsuccessfully transmit the video from the first group of videos is according to an equation $$q_1(1-w_1)+(1-q_1)q_2(1-w_2)=B,$$

wherein $q_1$ is a probability that the first communication link is available, $w_1$ is equal to a probability that the video is successfully transmitted over first communication link, $q_2$ is equal to a probability that the second communication link is available, and $w_2$ is equal to a probability that the video is successfully transmitted over the second communication link;

receiving, over the communication network, the first group of videos from the server;

storing the first group of videos in the video buffer of the processing system; and presenting a first video from the first group of videos to the user on a display of the processing system.

2. The communication device of claim 1, wherein the first group of videos are associated with a social media application.

3. The communication device of claim 1, wherein the server comprises a social media server.

4. The communication device of claim 1, wherein the first viewing information is stored in the memory, wherein the obtaining of the first viewing information comprises obtaining the first viewing information from the memory.

5. The communication device of claim 1, wherein the obtaining of the first viewing information comprises obtaining, over the communication network, the first viewing information from the server.

6. The communication device of claim 1, wherein the operations comprise determining a device type associated with the communication device, wherein the determining of the first group of video comprises determining the first group of videos based on the device type.

7. The communication device of claim 1, wherein the operations comprise determining a group of network conditions associated with the communication network, wherein the determining of the first group of video comprises determining the first group of videos based on the group of network conditions.

8. The communication device of claim 1, wherein the operations comprise determining a location of the communication device, wherein the determining of the first group of video comprises determining the first group of videos based on the location of the communication device.

9. The communication device of claim 1, wherein the operations comprise:

obtaining, over the communication network, second viewing information associated with a group of users from the server, wherein the second viewing information comprises a third probability indicating a probability that the group of users skips viewing a video, wherein the second viewing information comprises a fourth probability that the group of users views an entire video;

determining a second group of videos to request from the server based on the third probability and the fourth probability, wherein a second number of videos of the second group of videos is calculated according to a second equation comprising $[(\log 10(1-[(p3-p4)/P(z)])/\log 10(p4/p3)]-1$, wherein p3 is equal to the third probability, wherein p4 is equal to the fourth probability, wherein the P(z) is the probability of no videos are stored in the video buffer of the communication device and the user skips viewing the current video;

requesting, over the communication network, the second group of videos from the server;

receiving, over the communication network, the second group of videos from the server;

storing the second group of videos in the video buffer of the communication device; and presenting a first video from the second group of videos to the user on the display of the communication device.

10. The communication device of claim 9, wherein the determining of the second group of video comprises determining the second group of videos utilizing the AI software application.

11. A non-transitory machine-readable medium, comprising executable instructions that, when executed by a processing system including a processor, facilitate performance of operations, the operations comprising:

determining a user associated with the processing system;

obtaining first viewing information associated with the user, wherein the first viewing information comprises a first probability indicating a probability that a user skips viewing a video, wherein the first viewing information comprises a second probability that a user views an entire video;

determining available computer resources associated with the processing system;

selecting a portion of a group of artificial intelligence (AI) models based on the available computer resources, wherein the portion of the group of AI models comprises one or more of the group of AI models;

determining a first group of videos to request from a server based on the first probability and the second probability utilizing an AI software application, wherein the AI software application implements the portion of the group of AI models, wherein a first number of videos of the first group of videos is calculated according to an equation comprising $[(\log 10(1-[(p1-p2)/P(z)])/\log 10(p2/p1)]-1$, wherein p1 is equal to the first probability, wherein p2 is equal to the second probability, wherein P(z) is a probability of no videos are stored in a video buffer of the processing system and the user skips viewing a current video;

requesting, over a communication network, the first group of videos from a server, wherein the server selects first communication link and a second communication link from a group of communication links to transmit the first group of videos based on a probability to successfully transmit a video from the first group of videos is less than successful transmission threshold and a probability to unsuccessfully transmit the video from the first group of videos satisfies an unsuccessful transmission threshold, wherein the probability to successfully transmit the video from the first group of videos is according to an equation $q_1w_1+(1-q_1)q_2w_2=A$ and the probability to unsuccessfully transmit the video from the first group of videos is according to an equation $q_1(1-w_1)+(1-q_1)q_2(1-w_2)=B$, wherein $q_1$ is a probability that the first communication link is available, $w_1$ is equal to a probability that the video is successfully transmitted over first communication link, $q_2$ is equal to a probability that the second communication link is available, and $w_2$ is equal to a probability that the video is successfully transmitted over the second communication link;

receiving, over the communication network, the first group of videos from the server;

storing the first group of videos in the video buffer of the processing system; and presenting a first video from the first group of videos to the user on a display of the processing system.

12. The non-transitory machine-readable medium of claim 11, wherein the first group of videos are associated with a social media application.

13. The non-transitory machine-readable medium of claim 11, wherein the server comprises a social media server.

14. The non-transitory machine-readable medium of claim 11, wherein the first viewing information is stored in memory associated with the processing system, wherein the obtaining of the first viewing information comprises obtaining the first viewing information from the memory.

15. The non-transitory machine-readable medium of claim 11, wherein the obtaining of the first viewing information comprises obtaining, over the communication network, the first viewing information from the server.

16. The non-transitory machine-readable medium of claim 11, wherein the operations comprise:

obtaining, over the communication network, second viewing information associated with a group of users from the server, wherein the second viewing information comprises a third probability indicating a probability that the group of users skips viewing a video, wherein the second viewing information comprises a fourth probability that the group of users views an entire video;

determining a second group of videos to request from the server based on the third probability and the fourth probability, wherein a second number of videos of the second group of videos is calculated according to a second equation comprising $[(\log 10(1-[(p3-p4)/P(z)])/\log 10(p4/p3)]-1$, wherein p3 is equal to the third probability, wherein p4 is equal to the fourth probability, wherein P(z) is the probability of no videos are store in the video buffer of the processing system and the user skips viewing the current video;

requesting, over the communication network, the second group of videos from the server;

receiving, over the communication network, the second group of videos from the server;

storing the second group of videos in the video buffer of the processing system; and presenting a first video from the second group of videos to the user on the display of the processing system.

17. The non-transitory machine-readable medium of claim 16, wherein the determining of the second group of video comprises determining the second group of videos utilizing the AI software application.

18. The non-transitory machine-readable medium of claim 11, wherein a communication device comprises the processing system.

19. The non-transitory machine-readable medium of claim 18, wherein the communication device comprises a mobile device.

20. A communication device, comprising:

a processing system including a processor; and a memory that stores executable instructions that, when executed by the processing system, facilitate performance of operations, the operations comprising:

determining a user of the communication device;

obtaining first viewing information associated with the user, wherein the first viewing information comprises a first probability indicating a probability that a user skips viewing a video, wherein the first viewing information comprises a second probability that a user views an entire video;

determining available computer resources associated with the communication device;

selecting a portion of a group of artificial intelligence (AI) models based on the available computer resources, wherein the portion of the group of AI models comprises one or more of the group of AI models;

determining a first group of videos to request from a server based on the first probability and the second probability utilizing an AI software application, wherein the AI software application implements the portion of the group of AI models, wherein a first number of videos of the first group of videos is calculated according to a first equation comprising $[(\log 10(1-[(p1-p2)/P(z)])/\log 10(p2/p1)]-1$, wherein p1 is equal to the first probability, wherein p2 is equal to the second probability, wherein P(z) is a probability of no videos are stored in a video buffer of the communication device and the user skips viewing a current video;

obtaining, over a communication network, second viewing information associated with a group of users from a social media server, wherein the second viewing information comprises a third probability indicating a probability that the group of users skips viewing a video, wherein the second viewing information comprises a fourth probability that the group of users views an entire video;

determining a second group of videos to request from the server based on the third probability and the fourth probability utilizing the AI software application, wherein a second number of videos of the second group of videos is calculated according to a second equation comprising $[(\log 10(1-[(p3-p4)/P(z)])/\log 10(p4/p3)]-1$, wherein p3 is equal to the third probability, wherein p4 is equal to the fourth probability, wherein the P(z) is the probability of no videos are stored in the video buffer of the communication device and the user skips viewing the current video (p3);

determining a device type associated with the communication device;

determining a group of network conditions associated with the communication network;

determining a location of the communication device;

determining a time of day associated with the communication device;

determining a third group of videos to request from the server based on the first group of videos, the second group of videos, the device type associated with the communication device, the group of network conditions, the location of the communication device, the time of day associated with the communication device, and the available computer resources associated with the communication device utilizing the AI software application;

requesting, over a communication network, the third group of videos from a social media server, wherein the social media server selects first communication link and a second communication link from a group of communication links to transmit the first group of videos based on a probability to successfully transmit a video from the first group of videos is less than successful transmission threshold and a probability to unsuccessfully transmit the video from the first group of videos satisfies an unsuccessful transmission threshold, wherein the probability to successfully transmit the video from the first group of videos is according to an equation $q_1w_1+(1-q_1)q_2w_2=A$ and the probability to unsuccessfully transmit the video from the first group of videos is according to an equation $q_1(1-w_1)+(1-q_1)q_2(1-w_2)=B$, wherein $q_1$ is a probability that the first communication link is available, $w_1$ is equal to a probability that the video is successfully transmitted over first communication link, $q_2$ is equal to a probability that the second communication link is available, and $w_2$ is equal to a probability that the video is successfully transmitted over the second communication link;

receiving, over the communication network, the third
group of videos from the social media server;
storing the third group of videos in the video buffer of
the communication device; and
presenting a first video from the third group of videos
to the user on a display of the communication device
utilizing a social media software application associ-
ated with the social media server.

\*　\*　\*　\*　\*